US012478865B2

(12) United States Patent
Ironmonger et al.

(10) Patent No.: US 12,478,865 B2
(45) Date of Patent: Nov. 25, 2025

(54) INPUT APPARATUS FOR A GAMES CONSOLE

(71) Applicant: Ironburg Inventions Limited, Wincanton (GB)

(72) Inventors: Duncan Ironmonger, Milton, GA (US); Carl Jeffrey, Cheltenham (GB); Matthew Hooper, Bristol (GB)

( * ) Notice: Subject to any disclaimer, the term of this patent is extended or adjusted under 35 U.S.C. 154(b) by 327 days.

(21) Appl. No.: 18/260,678

(22) PCT Filed: Jan. 11, 2022

(86) PCT No.: PCT/GB2022/050048
§ 371 (c)(1),
(2) Date: Jul. 7, 2023

(87) PCT Pub. No.: WO2022/148976
PCT Pub. Date: Jul. 14, 2022

(65) Prior Publication Data

US 2024/0075382 A1 Mar. 7, 2024

Related U.S. Application Data

(60) Provisional application No. 63/135,811, filed on Jan. 11, 2021.

(51) Int. Cl.
*A63F 13/24* (2014.01)
*A63F 13/21* (2014.01)

(52) U.S. Cl.
CPC .............. *A63F 13/24* (2014.09); *A63F 13/21* (2014.09)

(58) Field of Classification Search
CPC ........ A63F 13/24; A63F 13/21; G06F 3/0202; H01H 11/0006; H01H 21/24; H03K 17/965
See application file for complete search history.

(56) References Cited

U.S. PATENT DOCUMENTS 4,032,728 A 6/1977 Oelsch
5,430,262 A 7/1995 Matsui et al.
(Continued)

FOREIGN PATENT DOCUMENTS

CA 203077157 7/2013
CN 202528096 11/2012
(Continued)

OTHER PUBLICATIONS

Sean Buckley: "Mad Catz MLG Pro Circuit controller review (PS3)," https://www.engadget.com/2012/01/29/mad-catz-mlq-pro-circuit-controller-review-ps3/ (Jan. 29, 2012).
(Continued)

*Primary Examiner* — Peter J Iannuzzi
(74) *Attorney, Agent, or Firm* — Walters & Wasylyna LLC

(57) ABSTRACT

The invention provides an input apparatus (110) for a computer comprising an outer case (114) having a front face (F), a top face (T) and opposing side walls. The apparatus (110) comprises at least one control located on the top face (T) of the apparatus (110). The apparatus (110) is shaped to be held in both hands of a user such that the user's index fingers are positioned to operate the at least one control located on the top (T) of the apparatus (110). The at least one control comprising an actuator (101, 106), a first sensor (132), and a second sensor (130). The actuator (101, 106) comprises an actuator body (106B) and a detection target (134) mounted thereto. The actuator body (106B) extends through an opening in the outer case (114). The detection target (134) is detectable by the second sensor (130). The actuator (101, 106) comprises an actuator control mechanism (TC) having at least two configurations for controlling movement of the actuator (101, 106) relative to the outer case (114). The actuator control mechanism (TC) comprises (Continued)

a stopping block (136) moveable relative to the actuator body (106B) and has first face for activating the first sensor (132) in a first configuration and a second face for limiting travel of the actuator in a second configuration. The actuator control mechanism (TC) further comprises a selector for selecting a desired one of the at least two configurations.

22 Claims, 15 Drawing Sheets

(56) References Cited

U.S. PATENT DOCUMENTS

| | | | | |
|---|---|---|---|---|
| 5,451,053 | A | 9/1995 | Garrido | |
| 5,773,769 | A | 6/1998 | Raymond | |
| 5,841,372 | A | 11/1998 | Matsumoto | |
| 5,874,906 | A | 2/1999 | Willner et al. | |
| 5,989,123 | A | 11/1999 | Tosaki et al. | |
| 6,203,432 | B1 | 3/2001 | Roberts et al. | |
| 6,251,015 | B1 | 6/2001 | Caprai | |
| 6,512,511 | B2 | 1/2003 | Willner et al. | |
| 6,752,719 | B2 | 6/2004 | Himoto et al. | |
| 6,760,013 | B2 | 7/2004 | Willner et al. | |
| 7,510,477 | B2 | 3/2009 | Argentar | |
| 7,758,424 | B2 | 7/2010 | Riggs et al. | |
| 7,859,514 | B1 | 12/2010 | Park | |
| 8,641,525 | B2 | 2/2014 | Burgess et al. | |
| 8,777,620 | B1 | 7/2014 | Baxter | |
| 9,089,770 | B2 | 7/2015 | Burgess et al. | |
| 9,804,691 | B1 | 10/2017 | Strahle et al. | |
| 10,446,344 | B2 * | 10/2019 | Tsai | H01H 21/22 |
| 2001/0003713 | A1 | 6/2001 | Willner et al. | |
| 2001/0025778 | A1 | 10/2001 | Ono | |
| 2002/0052237 | A1 | 5/2002 | Magill | |
| 2002/0128064 | A1 | 9/2002 | Sobota | |
| 2003/0067111 | A1 | 4/2003 | Swan | |
| 2004/0259059 | A1 | 12/2004 | Aoki | |
| 2005/0083297 | A1 | 4/2005 | Duncan | |
| 2005/0255915 | A1 | 11/2005 | Riggs et al. | |
| 2005/0255918 | A1 | 11/2005 | Riggs et al. | |
| 2006/0025217 | A1 | 2/2006 | Hussaini et al. | |
| 2006/0116204 | A1 | 6/2006 | Chen et al. | |
| 2008/0261695 | A1 | 10/2008 | Coe | |
| 2009/0088250 | A1 | 4/2009 | Carlson | |
| 2009/0258705 | A1 | 10/2009 | Guinchard | |
| 2010/0073283 | A1 | 3/2010 | Enright | |
| 2010/0267454 | A1 | 10/2010 | Navid | |
| 2010/0304865 | A1 | 12/2010 | Picunko | |
| 2011/0256930 | A1 | 10/2011 | Jaouen | |
| 2011/0281649 | A1 | 11/2011 | Jaouen | |
| 2012/0088582 | A1 | 4/2012 | Wu et al. | |
| 2012/0142417 | A1 | 6/2012 | Haswell et al. | |
| 2012/0142418 | A1 | 6/2012 | Muramatsu | |
| 2012/0142419 | A1 | 6/2012 | Muramatsu | |
| 2012/0299244 | A1 | 11/2012 | Rice et al. | |
| 2012/0322553 | A1 | 12/2012 | Burgess et al. | |
| 2012/0322555 | A1 | 12/2012 | Burgess et al. | |
| 2013/0147610 | A1 | 6/2013 | Grant et al. | |
| 2013/0150155 | A1 | 6/2013 | Barney et al. | |
| 2013/0196770 | A1 | 8/2013 | Barney et al. | |
| 2014/0274397 | A1 | 9/2014 | Sebastian | |
| 2015/0234479 | A1 | 8/2015 | Schantz et al. | |
| 2015/0238855 | A1 | 8/2015 | Uy et al. | |
| 2016/0082349 | A1 | 3/2016 | Burgess et al. | |
| 2016/0193529 | A1 * | 7/2016 | Burgess | A63F 13/24 463/37 |
| 2016/0296837 | A1 | 10/2016 | Burgess et al. | |
| 2016/0346682 | A1 | 12/2016 | Burgess et al. | |
| 2017/0001107 | A1 | 1/2017 | Burgess et al. | |
| 2017/0001108 | A1 | 1/2017 | Burgess et al. | |
| 2017/0087456 | A1 | 3/2017 | Burgess et al. | |
| 2017/0151494 | A1 | 6/2017 | Ironmonger et al. | |
| 2017/0157509 | A1 | 6/2017 | Burgess et al. | |
| 2019/0255431 | A1 * | 8/2019 | Ironmonger | A63F 13/24 |
| 2022/0347560 | A1 * | 11/2022 | Li | A63F 13/98 |

FOREIGN PATENT DOCUMENTS

| | | |
|---|---|---|
| DE | 202006003631 | 7/2007 |
| EP | 1078660 | 2/2001 |
| EP | 1140303 | 10/2001 |
| EP | 1 208 883 | 5/2002 |
| EP | 1 852 162 | 11/2007 |
| EP | 2440438 | 4/2012 |
| EP | 2 479 636 | 7/2012 |
| EP | 2 698 185 | 2/2015 |
| EP | 2 908 224 | 8/2015 |
| GB | 2 204 387 | 11/1988 |
| GB | 2 244 546 | 12/1991 |
| GB | 2 481 633 | 1/2012 |
| JP | H1020951 | 1/1998 |
| JP | 2001-84077 | 3/2001 |
| WO | WO 02/34345 | 5/2002 |
| WO | WO 03/046822 | 6/2003 |
| WO | WO 2005/103869 | 11/2005 |
| WO | WO 2007/040499 | 4/2007 |
| WO | WO 2008/131249 | 10/2008 |
| WO | WO 2012/036710 | 3/2012 |
| WO | WO 2014/187923 | 11/2014 |
| WO | WO 2015/004261 | 1/2015 |
| WO | WO 2015/078990 | 6/2015 |
| WO | WO 2015/110553 | 7/2015 |
| WO | WO 2015/173269 | 11/2015 |
| WO | WO 2016/176010 | 11/2016 |
| WO | WO 2016/191010 | 12/2016 |
| WO | WO 2018/167464 | 9/2018 |

OTHER PUBLICATIONS

Joe Robinson: "Mad Catz MLG Pro Circuit Controller Review," GameWatcher, Editorials, https: www.gamewatcher.co/editorials/mad-catz-mlq-pro-circuit-controller-review/11890# (Apr. 18, 2012).

Driph.com/words: "Mad Catz MLG Pro Circuit Controller review & comparison," https://driph.com/words/2012/01/mad-catz-mlg-pro-circuit-controller-review-comparison/ (Jan. 20, 2012).

Wikipedia: "Nintendo 64 accessories," https://en.wikipedia.org/w/index.php?title=Nintendo_64_accessories+oldid=784405317.

Wikipedia: "Rumble Pak," https://en.wikipedia.org/w/index.php?title=Rumble_Pak+oldid=768546573.

Nick Statt: "Scuf's new PS4 Controller adds wireless play and new customizable side buttons," The Verge, circuit breaker, https://www.theverge.com/circuitbreaker/2018/5/22/17378730/scuf-gaming-vantage-ps4-pro-controller-wireless-sax-buttons-customizable (May 22, 2018).

Wikipedia: "List of Nintendo DS accessories," https://en.wikipedia.org/w/index.php?title=List_of_Nintendo_DS_accessories+oldid=768095407.

Burns: "Review: Scuf Xbox 360 Controller," Xboxer360.com (2010).

"Rapid Fire Mod for Wireless Xbox 360 Controller," forum on xbox-scene.com (2008).

"Thrustmaster USB game controller roundup," dansdata.com/tmsticks.htm (2002).

Olin Coles: "Thrustmaster Run-N-Drive PC/PS3 Wireless Gamepad," BenchmarkReviews.com (2009).

Xbox 360 Wireless Controller Tour, published on May 13, 2005 at http://www.ign.com/articles/2005/05/13/xbox-360-wireless-controller-tour.

International Searching Authority: International Search Report and Written Opinion, Intl. App. No. PCT/GB2022/050048 (Apr. 6, 2022).

* cited by examiner

INPUT APPARATUS FOR A GAMES CONSOLE

This application is the U.S. national phase entry of Intl. App. No. PCT/GB2022/050048 filed on Jan. 11, 2022, which claims priority from U.S. Ser. No. 63/135,811 filed on Jan. 11, 2021. The entire contents of Intl. App. No. PCT/GB2022/050048 and U.S. Ser. No. 63/135,811 are incorporated herein by reference.

FIELD

The present invention relates to an input apparatus for a computer, such as, but not limited to, a games console, more particularly, but not exclusively the invention relates to, a hand-held controller for a games console.

BACKGROUND

Controllers for most current game consoles are generally intended to be held and operated by the user holding the controller in both hands, such controllers are sometimes referred to as "gamepads". A conventional controller will generally comprise a hard outer case with a plurality of controls mounted about the controller. Typically, the controls include buttons, analogue control sticks, bumpers and triggers and are provided upon the front or the top of the controller.

Some known game controllers include a form of actuator system for the operation of control of the functions of the video games. Actuators, buttons or other depressible or manually operable devices are typically used for controlling discrete actions such as the firing of a weapon or an attack command. It is known to provide a button or actuator which is intended to be operable by the index finger of a user; such buttons are commonly known as triggers.

At times, dependent upon the video game being played, it can be necessary to depress the trigger a distance before the trigger initiation point is reached and the command actually acknowledged. This renders part of the depressing action futile. Likewise, after the command has been operated, it is often possible to carry out further depression of the trigger past the trigger initiation point. This further depression is unnecessary and may also be undesirable. The strength or magnitude of a command is not increased or decreased in dependence upon how far the trigger is depressed.

Furthermore, in other situations in some video games, the strength of a command is increased or decreased dependent upon how frequently the trigger is depressed. As such, depressing the trigger the whole distance is unnecessary and excessive for the command or operation required.

In still other situations, the strength of a command is increased or decreased in dependence upon how far the trigger is depressed. As such, the ability to depress the trigger through the entire available range is necessary and required to fully execute the command or operation required.

It is desirable to have a controller, particularly for gaming applications, that is more responsive or has less scope for allowing unnecessary over-movement by the user of the controller. It is also desirable to provide a trigger mechanism which can be readily adjusted dependent upon the game being controlled to alter the degree of travel of the trigger mechanism.

Due to the rapidly expanding gaming market and development of involved games invoking considerable player input, it is desirable for players to be able to customise their controllers in order to gain increased control in a variety of types of games or gaming circumstances.

The present invention seeks to improve upon or at least mitigate some of the problems associated with controllers of the prior art by providing a game controller, which includes an adjustable trigger system that has a mechanism to allow the end user to control or recalibrate the maximum and/or minimum trigger positions.

SUMMARY

A first aspect of the present disclosure provides an actuator for controlling a command control in a computer input apparatus. The actuator comprises at least one sensor and may include a first sensor and a second sensor. The actuator comprises an actuator body and a detection target mounted thereto. The detection target is detectable by the second sensor. The actuator comprises an actuator control mechanism having at least two configurations for controlling movement of the actuator relative to the computer input apparatus. The actuator control mechanism comprises a stopping block moveable relative to the actuator body. The stopping block comprises at least one face for limiting travel of the actuator. The stopping block may comprise a first face for activating the first sensor in a first configuration and a second face for limiting travel of the actuator in a second configuration. The actuator control mechanism further comprises a selector for selecting a desired one of the at least two configurations.

Optionally, in the second configuration the stopping block limits travel of the actuator without activating the first sensor.

Optionally, the actuator control mechanism comprises a third configuration in which the stopping block is positioned in an idle position in which the stopping block is dormant, in the third configuration the actuator is moveable free from encumbrance by the stopping block.

Optionally, the actuator comprises a first range of motion in the first configuration and a second range of motion in the second configuration, the second range of motion being greater than the first range of motion.

Optionally, the actuator control mechanism comprises a plurality of a second configurations in which the second sensor detects the detection target, each of the plurality of a second configurations providing a unique range of motion.

Optionally, the selector comprises a cam rotationally mounted to the actuator.

Optionally, the cam comprises a plurality of detents engageable with a catch.

Optionally, the catch comprises a ball disposed within a bore and resiliently biased towards one end thereof.

Optionally, the selector comprises a lever for effecting rotational movement of the cam.

Optionally, the lever extends into an opening in the actuator body.

Optionally, the lever extends from the cam.

Optionally, the cam is rotationally mounted about an axle.

Optionally, the cam is rotationally mounted about a first end of the axle and the detection target is affixed to a second end of the axle.

Optionally, a shaft or limb extends from the cam and the stopping block is mounted to the shaft.

Optionally, the stopping block is located proximate a floating end of the shaft.

Optionally, the shaft is oriented substantially parallel to the axle and is rotatable thereabout.

Optionally, an arm couples the stopping block to the shaft.

Optionally, the first sensor provides a first input signal and the second sensor provides a second input signal.

A second aspect of the present disclosure provides an input apparatus for a computer comprising an outer case having a front face, a top face and opposing side walls. The apparatus comprises at least one control located on the top face of the apparatus. The apparatus is shaped to be held in both hands of a user such that the user's index fingers are positioned to operate the at least one control located on the top of the apparatus. The at least one control comprises an actuator, a first sensor, and a second sensor. The actuator comprises an actuator body and a detection target mounted thereto. The actuator body extends through an opening in the outer case. The detection target is detectable by the second sensor. The actuator comprises an actuator control mechanism having at least two configurations for controlling movement of the actuator relative to the outer case. The actuator control mechanism comprises a stopping block moveable relative to the actuator body and has first face for activating the first sensor in a first configuration and a second face for limiting travel of the actuator in a second configuration. The actuator control mechanism further comprises a selector for selecting a desired one of the at least two configurations.

Optionally, the stopping block comprises a plurality of faces, the first face is arranged to engage the first switch when in a first orientation, and the second face is arranged to provide an end stop limiting travel of the actuator when in a second orientation, in the second orientation the stopping block limits travel of the actuator relative to the outer case without activating the first sensor.

Optionally, the first and second sensor provide an input signal for executing or initiating a command in a computer program.

Optionally, the first switch or sensor provides a first input signal and the second sensor provides a second input signal.

Optionally, the detection target is detected by the second sensor, the second sensor comprises an electrical characteristic dependent upon a measured characteristic of the detection target.

Optionally, the second sensor is arranged to detect relative movement between the detection target and the second sensor.

Optionally, the second sensor is arranged to detect the proximity of the detection target to the second sensor.

Optionally, the second sensor provides an input signal in dependence of the degree of movement of the actuator.

Optionally, the detection target is a magnet and the second sensor is a magnetic sensor.

Optionally, the detection target is mounted to a limb extending from an actuator chassis.

Optionally, the detection target is mounted to a limb extending from the actuator body.

Optionally, the actuator is rotationally mounted to a frame member of the apparatus.

Optionally, the actuator is hinged to the frame member for rotational or pivotal movement about a single axis.

Optionally, the actuator is a trigger mechanism.

Optionally, the first sensor is a switch. Optionally, the first sensor is a tactile switch.

Optionally, the actuator control mechanism in the first configuration allows the actuator to activate the first sensor in response to movement of the actuator through a first range of motion, and wherein actuator control mechanism in the second configuration positions the stopping block such that the actuator is movable through a second range of motion, the second range of motion is greater than the first range of motion.

Optionally, the actuator control mechanism comprises three or more configurations each configuration allowing movement of the actuator through a respective range of motion.

Optionally, in at least one of the at least two configurations the stopping block limits travel of the actuator.

Optionally, in at least one of the at least two configurations the stopping block activates the first sensor upon depression of the actuator through its respective range of motion Optionally, the actuator control mechanism comprises a configuration in which the stopping block is positioned in an idle position in which the stopping block is dormant, in this configuration the actuator is moveable through a maximum range of motion free from encumbrance by the stopping block.

Optionally, the input apparatus is a hand-held controller for video games console.

Optionally, the apparatus comprises an overtravel limitation device for preventing or inhibiting transfer of excess or damaging force or pressure onto the first sensor in the first mode or configuration. Optionally, the stopping block may be configured to engage or contact an overtravel landing zone, the landing zone may be provided by a region of one of a PCB board, a controller chassis member, or a housing.

Within the scope of this application, it is envisaged or intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

Further features and advantages of the present invention will be apparent from the specific embodiments illustrated in the drawings and discussed below.

BRIEF DESCRIPTION OF THE DRAWINGS

Exemplary embodiments of the invention will now be described with reference to the accompanying drawings, in which:

FIGS. 3, 4A and 48 show an actuator or trigger mechanism according to an embodiment of the present disclosure, the trigger mechanism is illustrated in a first mode of use;

DETAILED DESCRIPTION

Figure 1A:
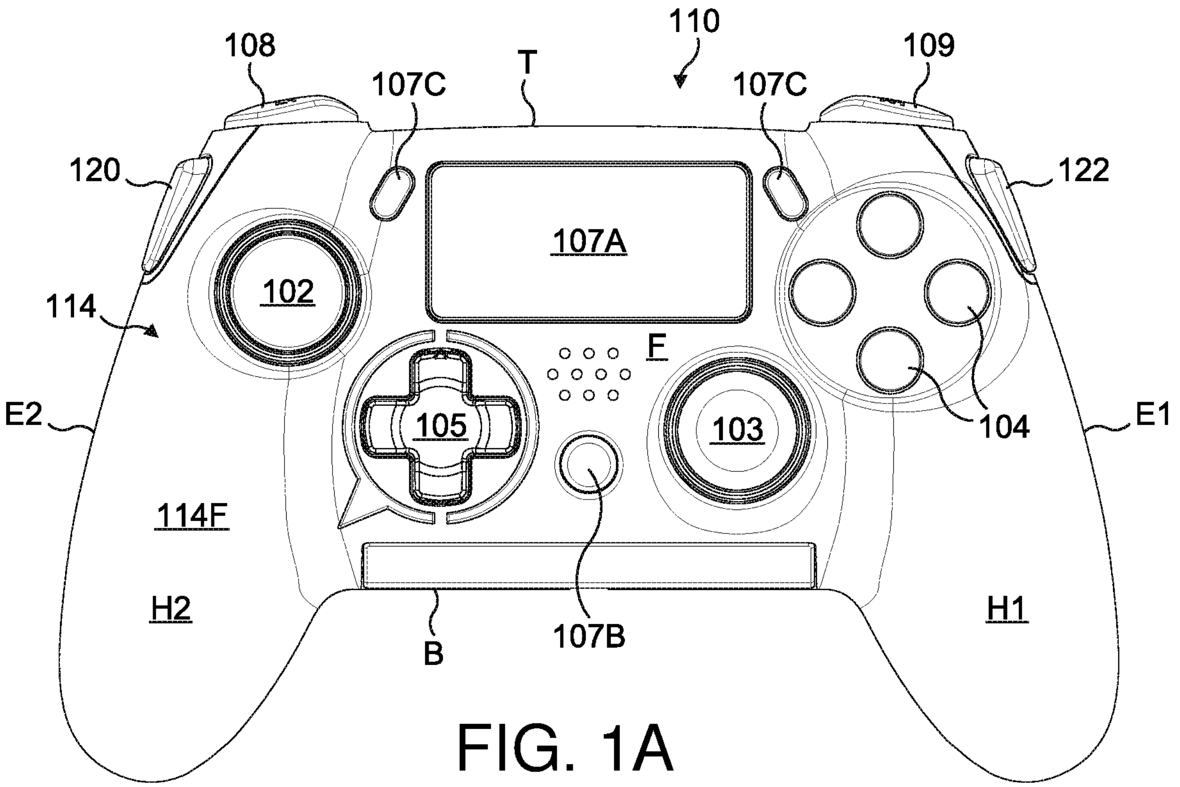
FIG. 1A is a schematic illustration of the front of an input apparatus for a games console.

Detailed descriptions of specific embodiments of an input apparatus, a controller, an actuator control mechanism and a method are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the input apparatus, the controller, the actuator control mechanism and the method described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention Referring to FIG. 1A there is shown a plan view from above of the front of an input apparatus 110 for a use with a computer. The input apparatus 110 illustrated takes the form of a controller 110 or game pad 110 for use with a video games console, personal computer, laptop computer or similar. In other embodiments, the input apparatus 110 may take the form of a handheld games console or other mobile device such as but not limited to a smartphone, tablet computer, phablet or the input apparatus 110 may be an accessory device (such as, but not limited to, a sleeve or case) for use with such a mobile device.

Figure 1B:
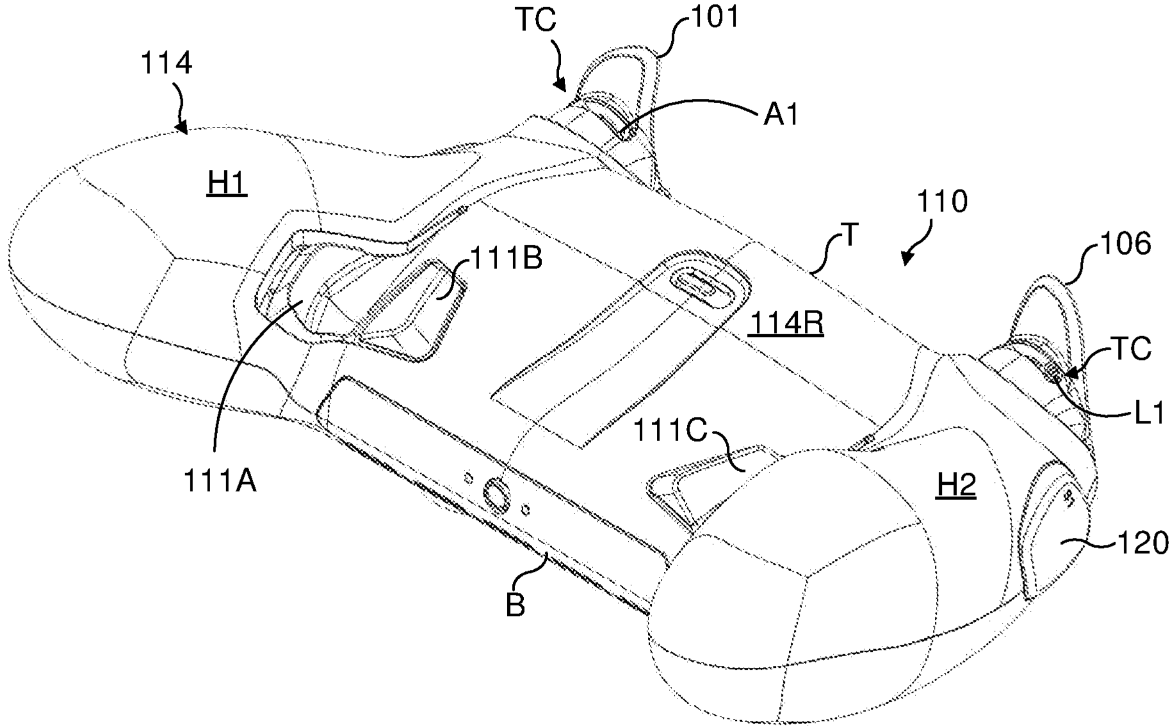
FIG. 1B is a perspective view of the back or rear of the input apparatus of FIG. 1A.
Figure 2:
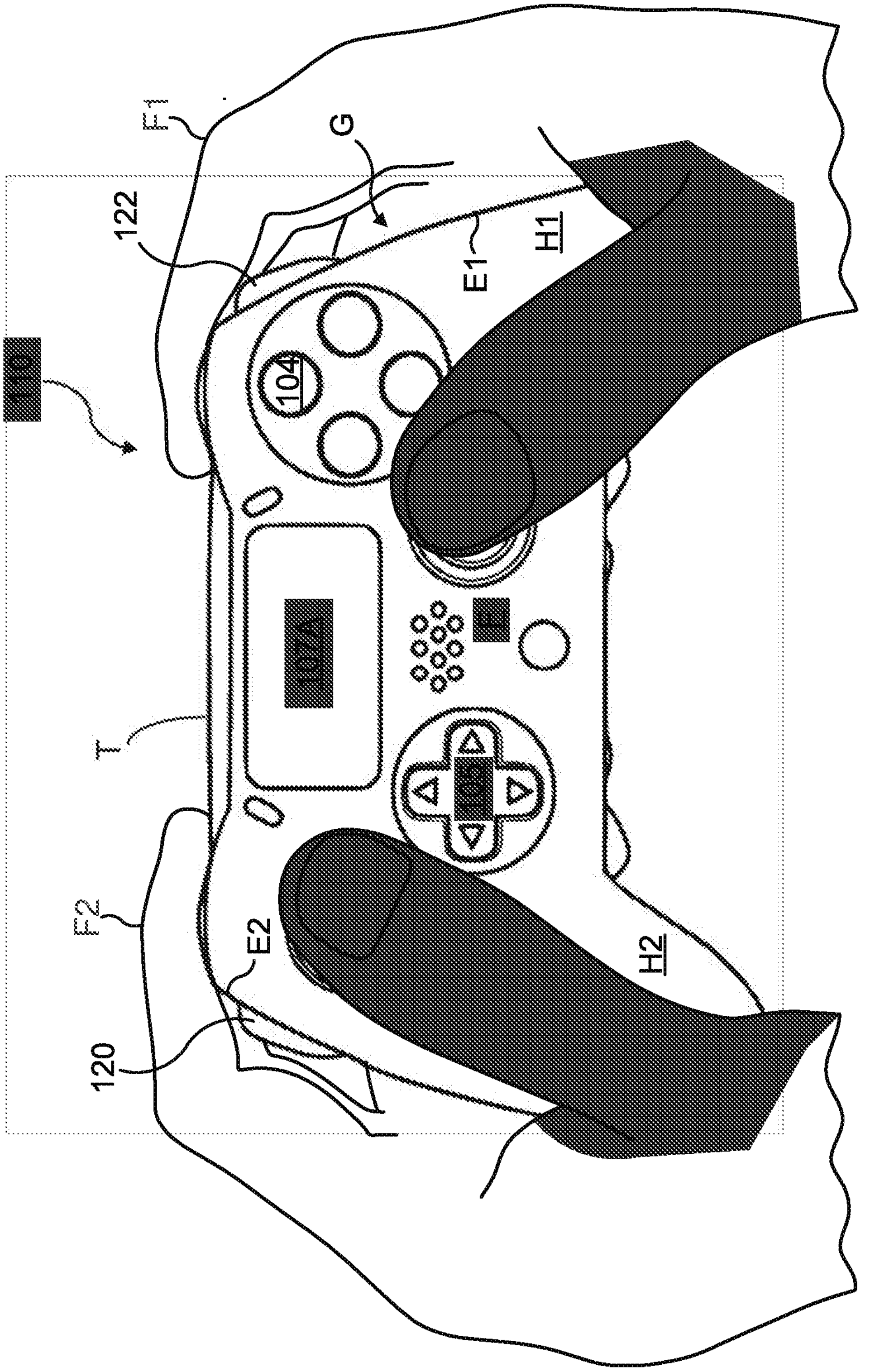
FIG. 2 is a perspective view of the front of the input apparatus of FIG. 1A showing the apparatus being held in the hands of a user.
Figure 3:
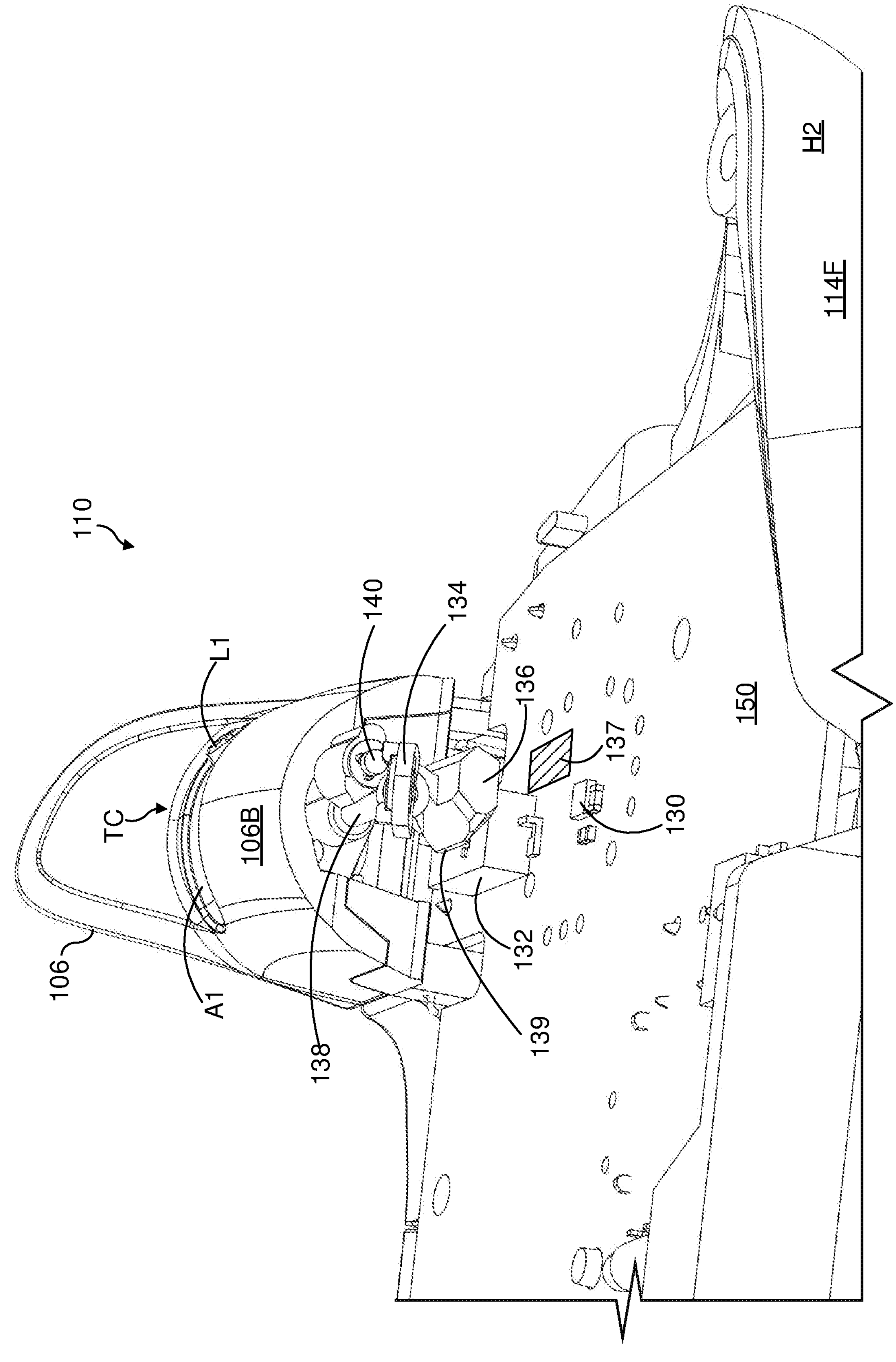
Figure 4A:
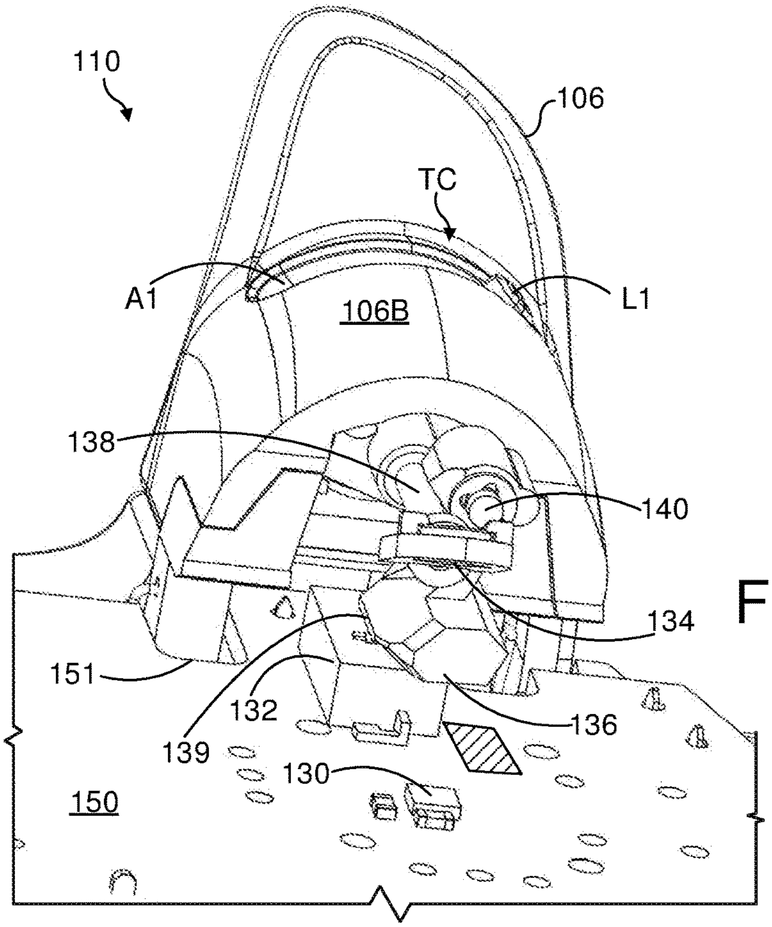
Figure 4B:
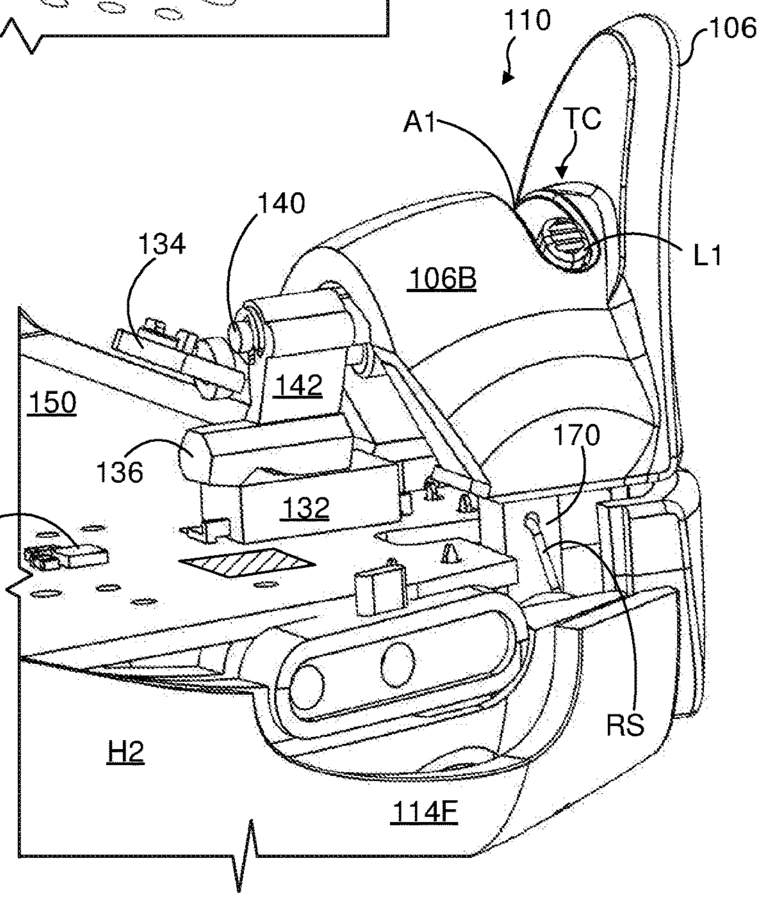
Figure 5:
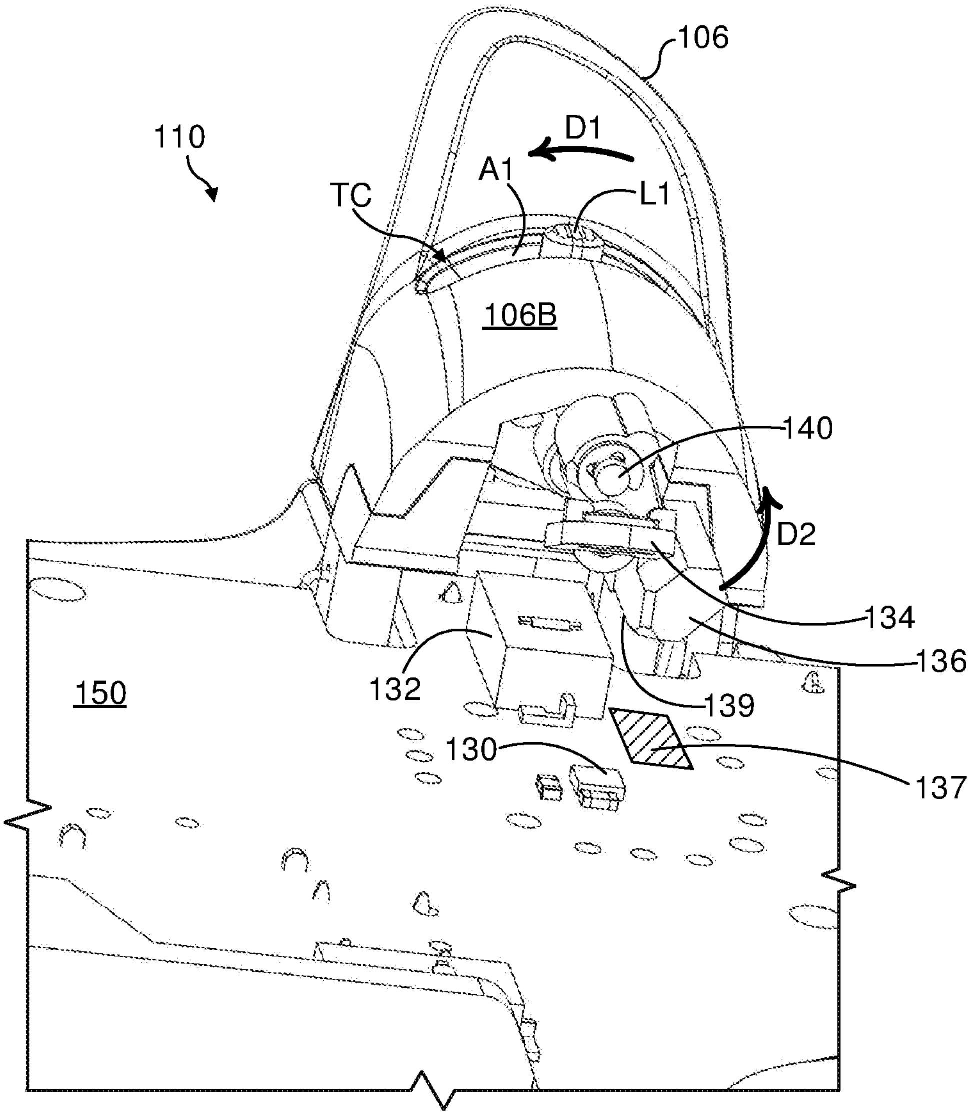
FIGS. 5 to 7 illustrate the trigger mechanism in a second mode of use.

The apparatus or controller 110 comprises an outer case or shell 114. The case 114 (also referred to herein as housing 114) may comprise one or more panels fitted together and or mounted to a chassis member. The case 114 may comprise a front body panel 114F and a rear body panel 114B (see FIG. 1B). The outer case 114 comprises a void in which electronic components (such as, but not limited to, switches 132 and/or sensors 130) are located. FIG. 2 shows an alternative view of the apparatus 110 in the hands of a user.

The apparatus or controller 110 comprises a plurality of controls which are mounted to the front F and to the top T of the apparatus 110. As used herein the term "front" refers to an upper surface of the apparatus 110 when in normal use held in both hands, whilst the term "top" refers to a leading edge of the apparatus 110 which typically faces away from a user when held in both hands. A rear or back of the controller opposes the "front" and typically will form a lower surface, whilst the term "bottom" B refers to a trailing edge of the apparatus 110 which typically faces towards the user when held in both hands. The apparatus 110 comprises a plurality of buttons or actuators which, when activated, initiate a specific action or control function. The apparatus 110 comprises at least one omnidirectional control stick or button which is operable to provide directional input.

Specifically, in the illustrated example shown, the apparatus 110 comprises first, left, and second, right, analogue control sticks, also known as thumb sticks 102, 103. The first left 102 and second right 103 thumb sticks normally control movement and are intended to be operated by the user's left and right thumbs respectively. Left and right thumb sticks 102, 103 are mounted to the front face F of the apparatus 110. The left thumb stick 102 is located in a forward (or upper i.e., nearer the top T of the apparatus 110) left region of the front face F; and right thumb stick 103 is located in a rearward (or lower i.e., nearer the bottom B of the apparatus 110) right region of the front face F. There are four buttons 104, located on a forward (or upper i.e., nearer the top T of the apparatus 110) right portion of the front face F of the apparatus 110. The four buttons 104 normally control additional actions and are intended to be operated by the user's right thumb. There is a direction pad 105 located on the rearward (or lower) left portion of the front face F of the apparatus 110. The direction pad 105 is intended to be operated by the user's left thumb, typically either as an alternative to the left thumb stick 102 or to provide additional action controls. In an embodiment, the positions of direction pad 105 and left thumb stick 102 may be reversed.

A left shoulder button or bumper 108 and a right shoulder button or bumper 109 are located on the top face T of the apparatus 110. A left trigger 106 and a right trigger 101 are also located on the top face T of the controller 10 (see FIG. 1B). The left and right triggers 106, 101 are typically operated by a user's index fingers. The left and right bumpers 8, 9 may also be operated by a user's index fingers. The left and right triggers 106, 101 may be analogue in nature, or may comprise a plurality of discrete digital states, that is to say the input control may be dependent upon the degree of depression or displacement of the trigger body.

The apparatus 110 may comprise one or more additional input buttons 107A, 1078, 107C, the buttons 107A, 1078, 107C may take the form of one or more digital or analogue buttons, or may be in the form of a touch pad or touch screen.

In order to operate any of the buttons 104 a user will normally remove their right thumb from the right thumb stick 103 so as to depress one or more of the buttons 104. Switching between the right thumb stick 103 and the buttons 104 takes time since the user's thumb must traverse the distance therebetween. This may also cause a loss of, or reduction in, control in some games because the user has to relinquish control over the right thumb stick 103 in order to control the buttons 104. This may be a particular problem in games where the right thumb stick 103 is used for aiming. A similar problem may arise in games where the direction pad 105 provides additional actions and the user has to remove their left thumb from the left thumb stick 102 in order to operate the direction pad 105.

The apparatus 110 comprises at least one handle H1, H2. The apparatus 110 comprises two handles H1, H2 disposed on opposing sides of an intermediate body portion.

The apparatus 110 may comprise at least one actuator or additional control 111A, 111B, 111C, 111D mounted to, or located in or upon the rear or back R of the apparatus 110, where the rear or back face R is opposite the front face F (the face F to which the buttons 104, left and right thumb sticks 102, 103 and direction pad 105 are mounted).

The apparatus 110 may comprise additional input controls 111A, 111B, 1110, 111D on the rear face R of the intermediate body portion, on the inner walls of the handles H1, H2 or alternatively on both the rear face R of the intermediate body portion and the inner walls of the handles H1, H2. The additional input controls 111A, 111B, 111C, 111D are configured to activate a switch or sensor disposed internally thereof. The switch or sensor may be mounted internally, at least in part, of the housing 114.

The apparatus 110 may comprise a first additional control 111A (also referred to herein as integral input controls 1111A, 1111D) provided in an inner rear surface of a first handle H1. The first additional control 111A may be integral with outer case or shell 114 of the apparatus 110. The first additional control 111A may be integral with the rear body panel 114B forming the handle H2.

The first additional control 111A is defined, at least in part, by a cutaway in the form of a slot or slit provided in the first handle H1. The cutaway defines, at least in part, a displaceable region of the first handle H1 and/or intermediate body portion. A proximal end of the displaceable region is coupled or connected to the first handle H1 and/or intermediate body portion by a living or integral hinge. In this way the first additional control 111A is unitary with the housing 114 or a panel 114R thereof.

The apparatus 110 may comprise a second additional control 111B provided in a rear surface of the intermediate body portion. The second additional control 111B is provide in a region of the intermediate body portion adjacent, or proximate, to the first handle H1.

The second additional control 111B (also referred to herein as discrete additional input control 111B) may be separate from the housing 114 of the apparatus 110. The second additional control 111B may be affixed to the housing 114. The second additional control 111B may be mounted to the housing by a mounting mechanism disposed within the interior of the housing 114. The second additional control 111B may be slidably, depressibly, rotationally or pivotally mounted to the housing 114. A receiver may be provided by the housing 114, the second additional control 111B may comprises a catch, lug, detent, trunnion or other element receivable in the receiver. It will be appreciated that in alternative embodiments the second additional control 111B may be provided with the receiver for receiving a portion of the mounting mechanism provided by the housing 114. The second additional control 111B may extend through an opening in the outer case 114. In other embodiments, the second additional control 111B may affixed or mounted to an outer surface of the case 114 and extend over a portion of the case 114 in close proximity thereto.

The second, opposing, handle H2 comprises a third additional control (not shown) similarly arranged to the first additional control 111A and the intermediate body portion comprises fourth additional control 111C similarly arranged to the second additional control 111B.

The second additional control 111B is provided at a region of rear case disposed between the handles H1, H2. The apparatus 110 comprises two discrete additional input controls 111B, 111C. Each discrete additional input control 111B, 111C is disposed proximate to one of the pair of handles H1, H2.

Each discrete additional input control 111B, 111C may be pivotally coupled to the apparatus 110. The discrete additional input controls 111B, 111C may be comprise a first side which is a fixed or pivotal side and second side which is a free or moveable side. In the illustrated embodiment, the fixed side is disposed in closest proximity to the adjacent handle H1, H2. In other embodiments, the fixed and free sides may be reversed such that the free or moveable side is in closest proximity to the adjacent handle H1, H2. The discrete additional input controls 111B, 111C comprise a body which is engaged by the user. The body may be arranged such that the free or moveable side projects or protrudes outwardly of the housing 114 so as to stand proud of the adjacent region of the outer case 114. The fixed or pivotal side may be flush with the housing 114. In other embodiments, the fixed side may be inset with respect to the housing, that is to say disposed within the interior of the housing 114. In still other embodiments, the fixed or pivotal side may protrude from the housing albeit to a lesser extent than the free side.

In other embodiments, the second additional control 111B may be defined, at least in part, by a cutaway in the form of a slot or slit provided in the intermediate body portion. The cutaway defines, at least in part, a displaceable region of the intermediate body portion. A proximal end of the displaceable region of the intermediate body portion is coupled or connected to the intermediate body portion by a living or integral hinge. In this way the second additional control 111B is unitary with the housing 114 or a panel 114R thereof.

The user may operate the first and second additional controls 111A, 111B with a grip finger, that is to say a finger employed to grasp the first handle H1; typically, the middle, ring and little fingers. Although it is envisaged that the index finger could be employed to actuate the first and second additional controls 111A, 111B.

When released by a user the first or second additional control 111A, 111B returns to the rest position. Each of the first and second additional controls 111A, 111B is resiliently biased to return to the rest position. A bias mechanism is provided, the bias mechanism may be a spring or similar device. The bias mechanism may be part of the switch or sensor. In some embodiments, the bias mechanism may be provided by the natural or inherent resilience of the material forming the outer case from which the first and second additional controls 111A, 111B are struck from or provided by.

A mechanism may be provided to disable each of the first and second additional controls 111A, 111B respectively. The mechanism may take the form of a cam located within the void outer of the case 114. The cam may be moved or rotated into a position in engagement with an inner surface of one of the first and second additional controls 111A, 111B so as to inhibit or prevent displacement of that additional control 111A, 111B. In this way the additional control effectively becomes a rigid portion of the outer case 114. In other embodiments, the additional controls 111A-111D may take on other forms, such as one or more paddles levers. In such embodiments a portion or all of the paddle levers may be disposed on, in, or proximate to panel 114R, and in some embodiments a portion of one or more of the paddle levers may be disposed on, in, or proximate to one of handle H1 or handle H2. In yet other embodiments, one or more of additional controls 111A to 111D may comprise portions of rear panel 114 and/or handle H1 or handle H2 in communication with or comprising a touch sensitive sensor such as a capacitive sensor or a proximity sensor such as an optical sensor.

In order to operate the controls mounted upon the top T of the apparatus 110 a user will normally wrap their index fingers about the side edges or walls E1, E2 of the controller case 114, as shown in FIG. 2. In FIG. 2 the index fingers F1, F2 are bent or crooked about forward or leading corners of the apparatus 110.

The user can operate either the left shoulder button 108 or left trigger 106 with the index finger F2 of their left hand and can operate either the right shoulder button 109 or right trigger 101 with the index finger F1 of their right hand (see FIG. 2).

The user may also wrap their middle fingers about the side edges or walls E1, E2 of the controller case 114. The middle fingers may be bent or crooked about forward or leading corners of the apparatus 110. The user can operate the left shoulder button 108 with the index finger F2 of their left hand and can operate the right shoulder button 109 with the index finger F1 of their right hand and may operate the left trigger 106 with the middle finger of their left hand and may operate the right trigger 101 with the middle finger of their right hand.

The user may place the pad of the end of their index fingers F1, F2 and/or middle fingers on the controls on the top T of the apparatus 110. When doing so the user fingers may leave a gap G between side walls E1, E2 of the controller case 114 and the adjacent finger.

Optionally, the input apparatus 110 comprises an actuator or additional control 120, 122 upon at least one of the side walls E1, E2 of the controller case 114 proximate the top or leading-edge T of the apparatus 110. The additional controls 120, 122 may be disposed in an upper region of the side walls E1, E2 of the controller case 114 that is to say proximate the front F of the apparatus 110. The additional controls 120, 122 are disposed in the crook of a respective one of the index fingers F1, F2, the additional controls 120, 122 may at least partially fill the gaps G.

The additional control 120, 122 are arranged to be operated by a user engaging or pressing the control 120, 122 with one of the phalanges of the index finger F1, F2 or middle finger, preferably the user's proximal phalanx or rather the fleshy part thereabout.

In this way the additional controls 120, 122 are operable by an intermediate portion of the user's index or middle finger, wherein the intermediate portion is disposed between the finger pad or end of the finger and the metacarpophalangeal joint.

In contrast to the shoulder buttons 108, 109 and the triggers 101, 106 which are operated by bending the index finger F1, F2, the additional controls 120, 122 may be operated by a straightening action of the index finger F1, F2 or middle finger. In this way the user's proximal phalanx is brought towards the additional control 120, 122 so as to activate the control 120, 122.

The user may operate the additional controls 120, 122 when their index finger F1, F2 is at rest upon or aligned with the shoulder button 108, 109 or 122, when their index finger F1, F2 is at rest upon or aligned with the triggers 101, 106 or when their middle finger is at rest upon or aligned with the triggers 101, 106.

The user may operate the additional controls 120, 122 without altering the alignment of their index finger with whichever of the top controls, shoulder button or trigger, that their finger is poised over.

The additional control 120 may replicate at least one function of at least one of the controls disposed on the front or top of the apparatus 110, for example it may replicate the function operated by the left shoulder button 108, left trigger 106 or both the functions of the left shoulder button 108 and left trigger 106. The additional control 120 may replicate the function of one of the controls disposed on the front of the apparatus 110 for example, but not limited to, buttons 104.

The additional control 122 may replicate the function operated by either the right shoulder button 109 or right trigger 101. The additional control 122 may replicate the function of one of the controls disposed on the front of the apparatus 110 for example, but not limited to, buttons 104.

Alternatively, the additional controls 120, 122 may control a new command function.

The apparatus 110 comprises an actuator control mechanism TC for controlling the range or degree of travel of at least one actuator. The actuator control mechanism TC is configured to control the range of motion of a trigger 101, 106. The trigger actuators 101, 106 may also provide both of an analogue input control and/or a digital input control. The actuator control mechanism TC may provide an interface for selecting between analogue and digital input or between two different sensors for the trigger actuators 101, 106 to provide an input control.

Figure 13A:
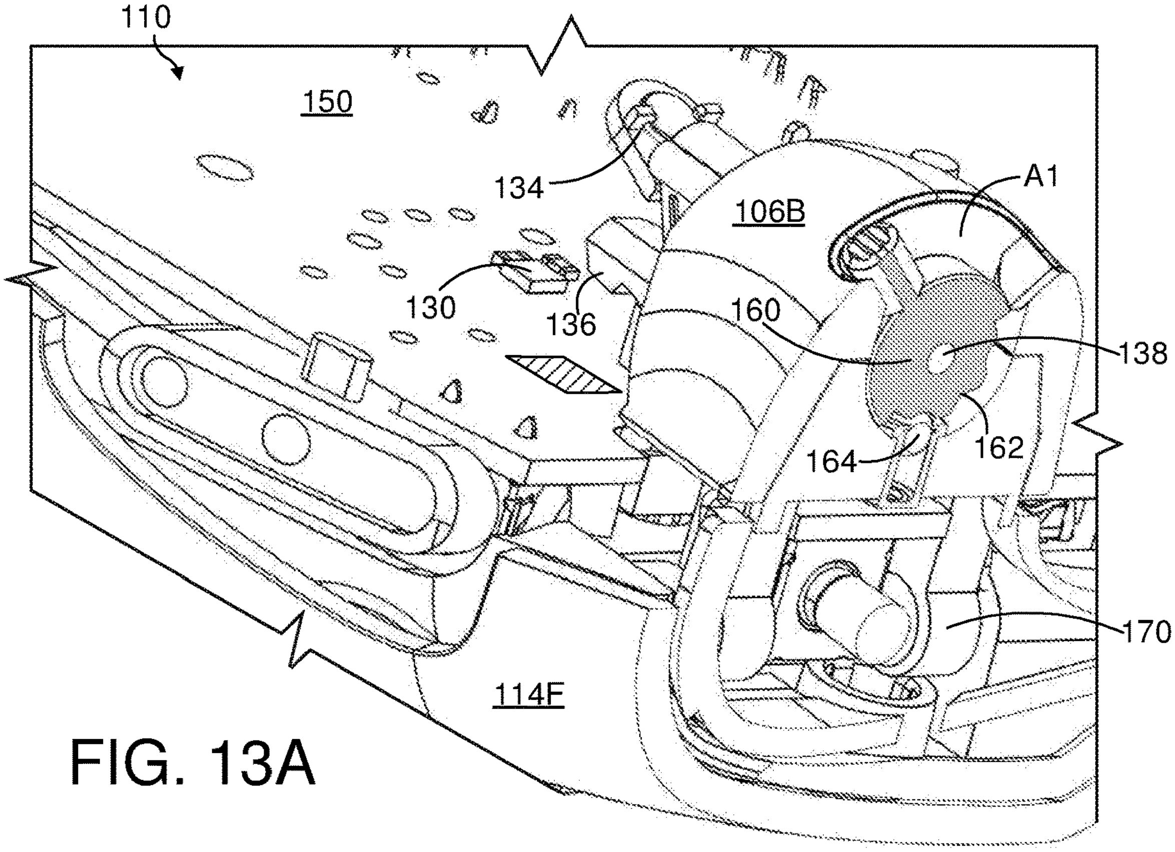
FIGS. 13A and 13B show sectional views of the trigger mechanism.
Figure 13B:
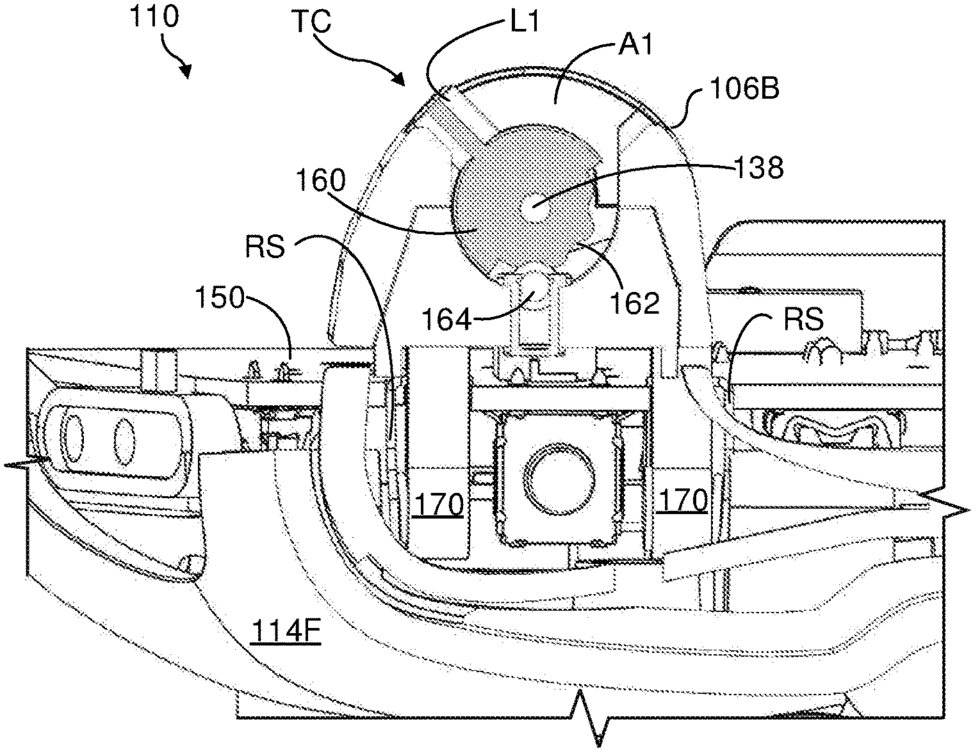
Figure 14A:
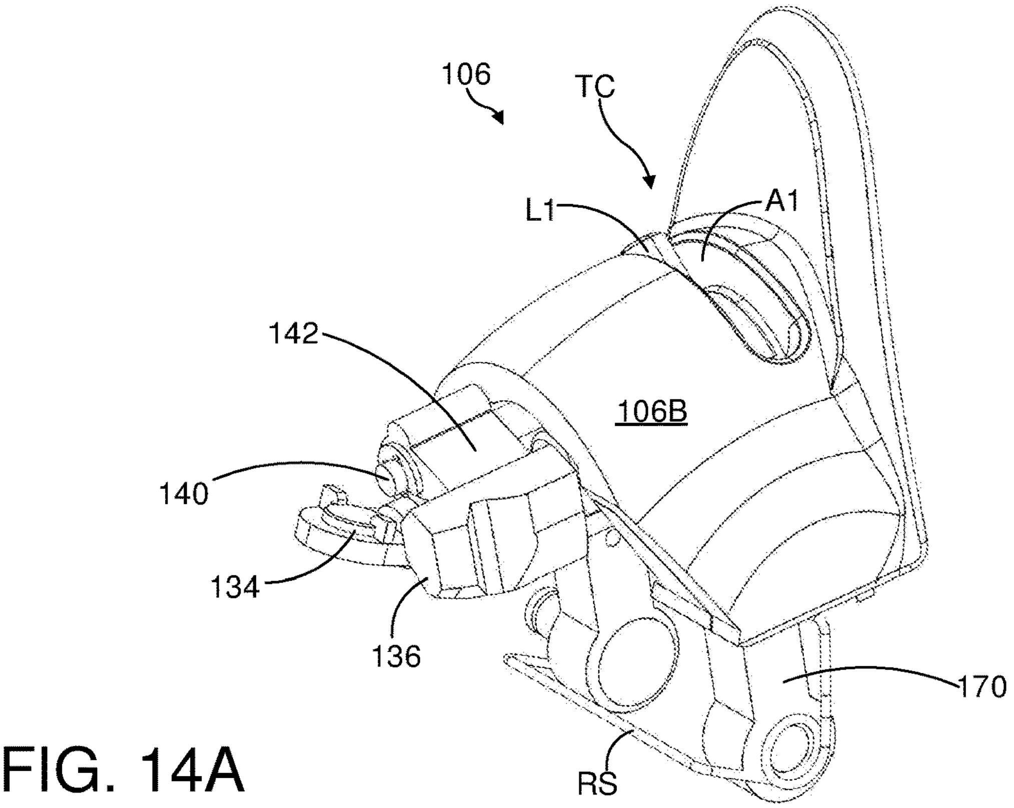
FIGS. 14A and 14B show the trigger mechanism separate from the input apparatus.
Figure 14B:
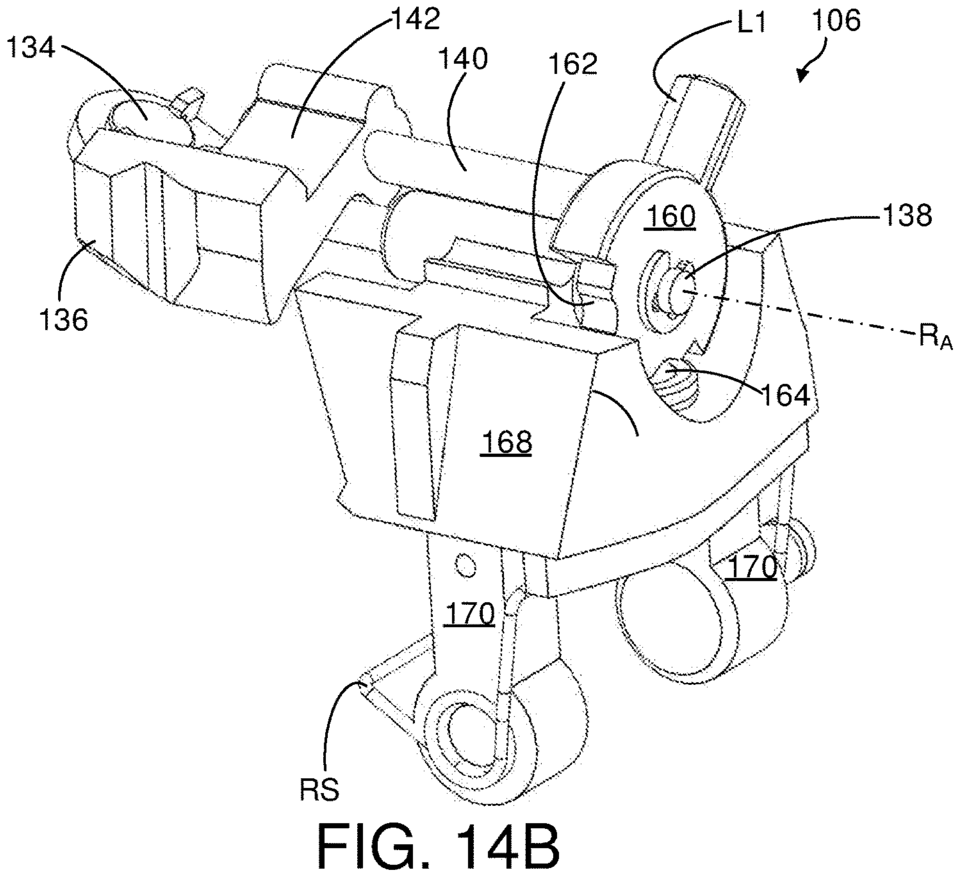
Figure 15:
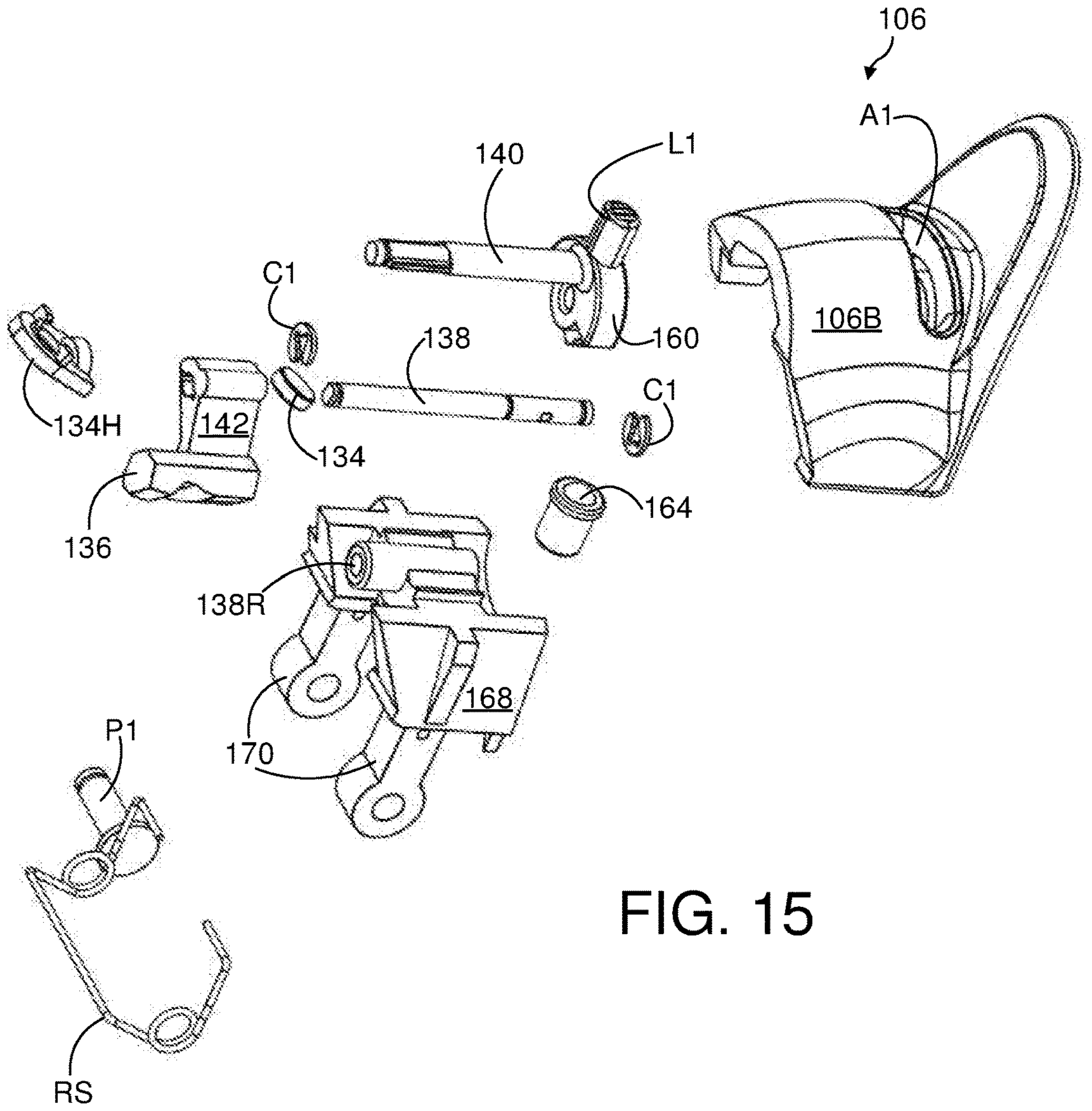
FIG. 15 shows an exploded view of the trigger mechanism shown in FIG. 14A.

The actuators 101, 106 are pivotally mounted to a chassis member or housing panel. Each of the actuators 101, 106 are substantially similar in construction and will be described in further detail with regard to the left trigger or actuator 106. FIGS. 13A and 13B show a sectional view of an embodiment of actuator 106 in which portions of the apparatus or controller 110 have been hidden or removed for illustrative purposes. FIGS. 14A and 14B illustrate the embodiment of actuator 106, in FIG. 14B an actuator body 106B has been omitted for illustrative purposes. FIG. 15 is an exploded view of the components forming the actuator 101, 106. The actuator 106 comprises a chassis 168 having at least one limb 170 providing a pivotal mounting, the illustrated embodiment, the chassis 168 comprises a pair of limbs 170 each providing a pivotal mounting. A biasing device RS which in the illustrated embodiment is in the form of return spring biases the actuator 101, 106 to a first position or orientation, also referred to herein as a start or rest position.

The actuator body 106B comprises an opening or aperture A1 through which a selector or lever L1 extends. In alternative embodiments, the selector or lever L1 may extend through an opening or aperture located in the back panel 114R. The lever L1 forms part of the actuator control mechanism TC. The lever L1 is coupled to, or integral with a cam 160. The cam 160 comprises a through hole for receiving an axle 138. The axle 138 defines a rotational axis RA about which the cam 160 rotates. A limb in the form of a shaft or cylinder 140 extends from the cam 160. The shaft 140 is radially offset with respect to the rotational axis RA of axle 138. The shaft 140 extends substantially parallel to the rotational axis RA or axle 138. The lever L1 extends radially outward from the rotational axis RA of axle 138.

The lever L1 comprises a first end proximate the cam 160 and a second, distal, end opposite the first end. In the illustrated embodiment, the distal end of the lever L1 is arranged to be substantially flush with the portion of the body 106B surrounding the aperture A1. In other embodiments, the distal end of the lever L1 may be proud of, protruding from, the portion of the body 106B surrounding the aperture A1. In still other embodiments, the distal end of the lever L1 may be recessed or inset in the aperture A1 in the body 106B.

The chassis 168 comprises a receiver 138R for receiving or mounting the axle 138 thereto. The receiver comprises a bore through which the axle 138 extends. The axle 138 may be fixed or static with respect to the chassis 168. The axle 138 and the receiver 138R may form a friction or interference fit. Alternatively, the axle 138 and the receiver 138R may be keyed (for example a spline) to prevent relative rotation between the axle 138 and the receiver 138R.

A detection target in the form of a magnet 134 is mounted to a first or inner end of the axle 138. A magnet holder 134H is couples the magnet 134 to the axle 138. In other embodiments, an alternative detection target may be employed dependent upon the sensor type employed.

The cam 160 is mounted to a second or outer end of the axle 138. A retainer C1 secures the cam 160 to the axle 138. The retainer C1 may take the form of a circlip, although other suitable fasteners may be employed in alternative embodiments.

The actuator control mechanism TC comprises a stopping block 136 mounted to, or integral with, an arm 142. The arm 142 is mounted to a first or inner end of the shaft 140. The shaft 140 comprises a key or spline. The shaft 140 may comprise a key or male spline that matches key way or female spline defined in an orifice or opening in the arm 142. In this way the arm 142 is rotationally fixed with respect to the shaft 140, that is to say the arm 142 is prevented or inhibited from relative rotational movement with respect to the shaft 140.

The arm 142 spaces apart, in a radial direction, the stopping block 136 from the shaft 140. The arm 142 is shaped so as to allow the arm 142 and stopping block 136 to rotate about the axle 138.

The actuator control mechanism TC comprises a detent for inhibiting or arresting rotation of the cam 160 about the axle 138. The detent takes the form of ball detent. A ball or sphere 164 is sliding mounted within a bored cylinder, against the pressure of a spring. The bored cylinder is mounted within the chassis 168; in other embodiments, the ball 164 may be mounted directly into the chassis 168. The cam 160 comprises at least one, two, or three detents 162. The detents 162 take the form of recesses about a portion of the perimeter or edge of the cam 160.

Each detent 162 defines a relative orientation of the cam 160 with respect to the chassis 168 or a rotational position of the cam 160 about the axle 138.

Rotation of the lever L1 about the rotational axis RA has the effect of rotating the arm 142 and the stopping block 136. The lever L1 is rotatable into one of a plurality of predefined positions or orientations.

In a first orientation or mode of use, shown in FIGS. 13A, 138, 3, 4A, and 48, the arm 142 is orientated substantially perpendicularly with respect to a printed circuit board 150 disposed within the housing 114. The lever L1 is disposed in a first position, the ball 164 engages a first detent 162 as shown in FIG. 13B.

In the first orientation, the stopping block 136 is disposed directly over a switch or sensor 132. The switch 132 or sensor 132 may take the form of a tact or tactile switch in one embodiment, while in other embodiments it may take the form of an optical, magnetic, or other type of sensor. In the illustrated embodiment, a switch 132 is implemented. A face or surface of the stopping block 136 is arranged to be in close proximity with an activation surface of the switch 132 such as a plunger or pushbutton of the switch 132. A face or surface of the stopping block 136 may be spaced apart from the activation surface of switch 132 by a small distance, this allows tolerance for rotational movement of the stopping block 136.

Figure 16:
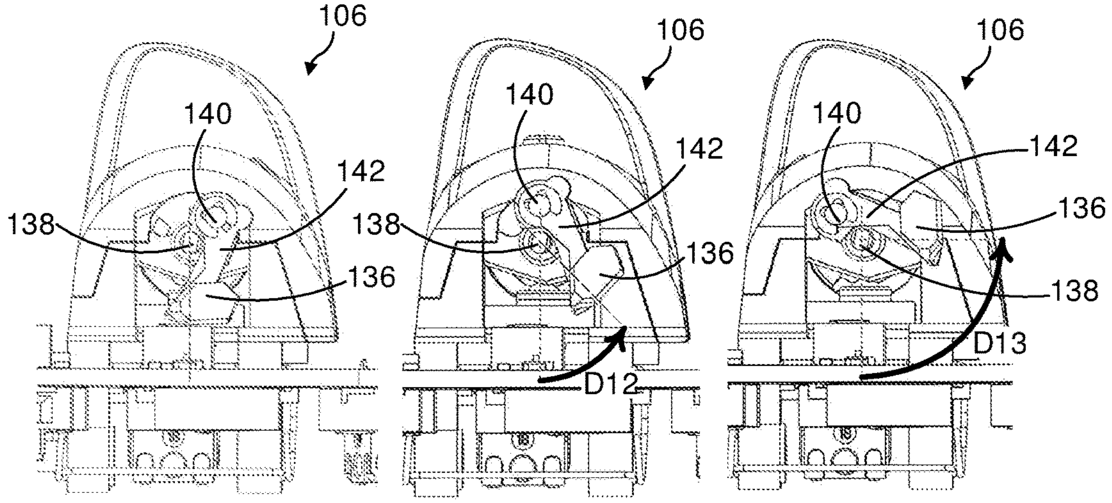
FIG. 16 illustrates three positions of an actuator control mechanism for limiting travel of the trigger mechanism shown in FIG. 14A.

In the first orientation, the stopping block 136 is disposed generally under or below the shaft 140, best shown in FIG. 16.

When the lever L1 is in the first orientation the actuator 106 may be engaged by a user, for example, but not limited to, using an index finger, to effect actuation of the switch 132. In this mode of operation, the actuator 106 operates in a digital mode. A small or slight movement of the actuator 106 activates the switch 132 and instigates a control input to execute a command or function in a computer program. The actuator 106 is moveable through a first range of motion, the first range of motion may be substantially similar to or marginally greater than the range of motion of the plunger or pushbutton of the switch.

In a second orientation or mode of use, shown in FIGS. 5, 6A, 68, and 7, the arm 142 is orientated obliquely with respect to the printed circuit board 150 disposed within the housing 114. The lever L1 is moved or rotated about the axle 138 to a second position as indicated by direction arrow D1 in FIG. 5. Movement of the lever L1 has the effect of moving or rotating the arm 142 and the stopping block 136 as indicated by direction arrow D2. In some embodiments, the lever L1 is moved through an angle of 45° from the first position to the second position, however in other embodiments, the other angular movements may be employed. The ball 164 engages a second or medial detent 162.

In the second orientation or mode of use, the arm 142 is oriented obliquely with respect to the printed circuit board 150 disposed within the housing 114. The stopping block 136 is no longer disposed in vertical registry or alignment with the shaft 140. The shaft 140 is disposed generally above or over the axle 138, best shown in FIG. 16.

Figure 6A:
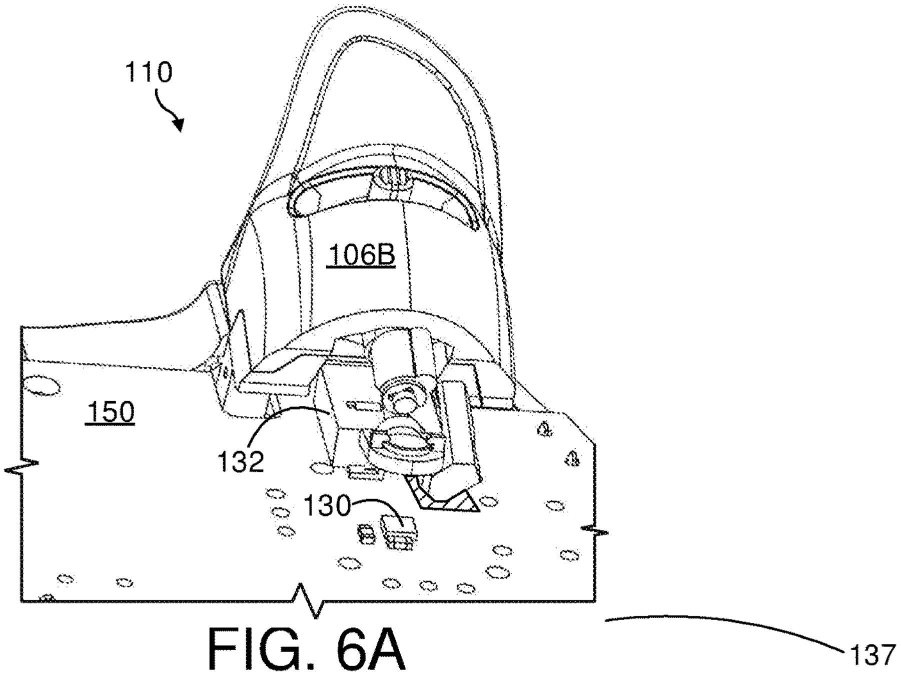

In the second orientation or mode of use, the stopping block 136 is moved away from the switch 132. The arm 142 and the stopping block 136 are shaped and configured to avoid contact with the switch 132 when the actuator 106 is in a depressed or activated state, as shown in FIGS. 6A, 6B and 7.

Figure 6B:
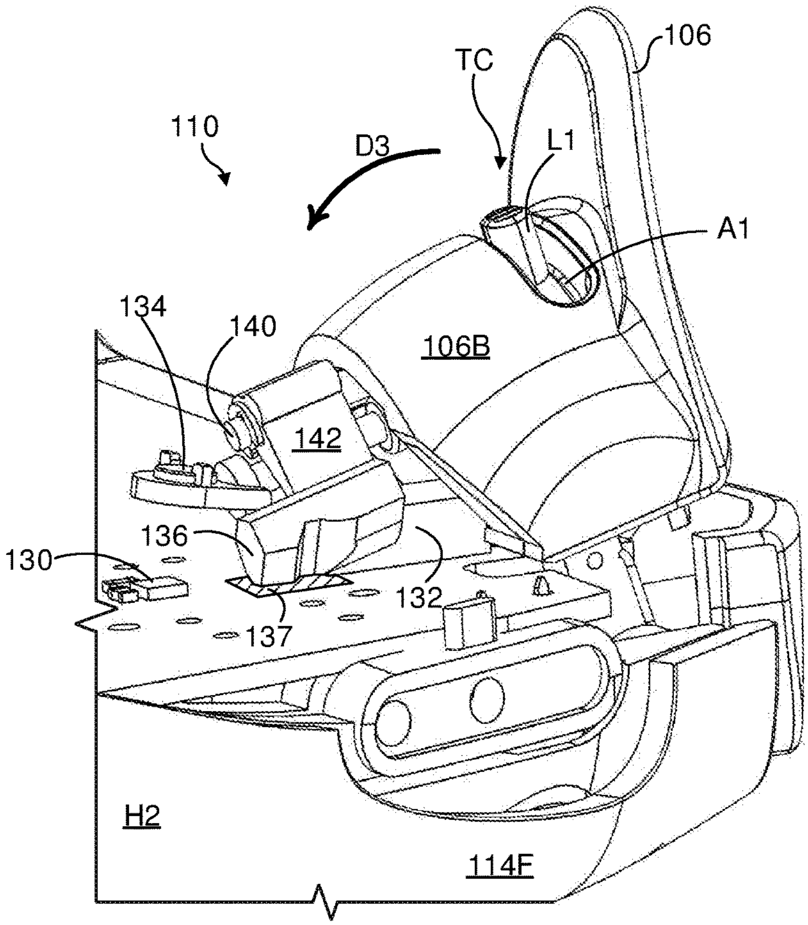
Figure 7:
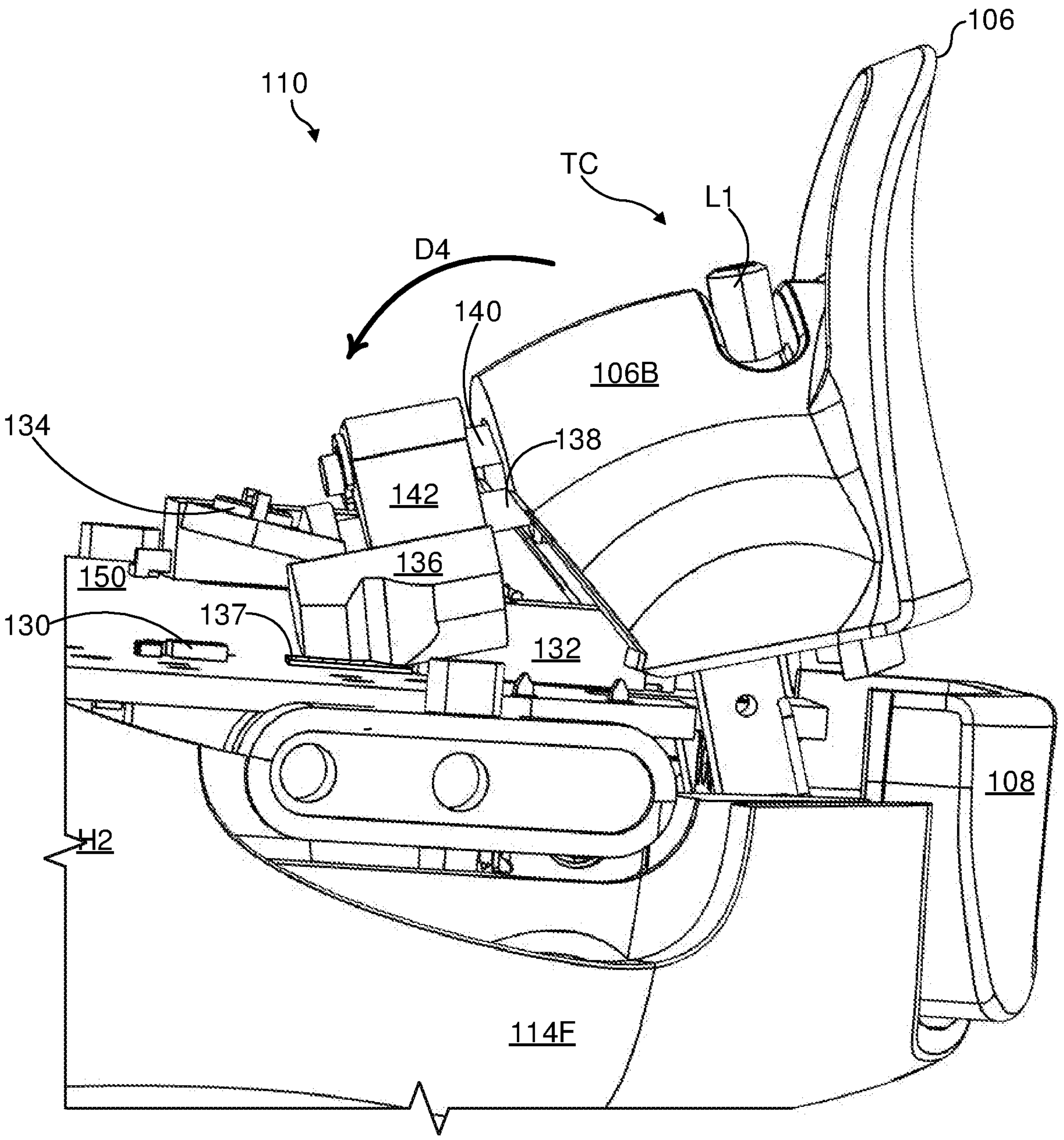
Figure 8:
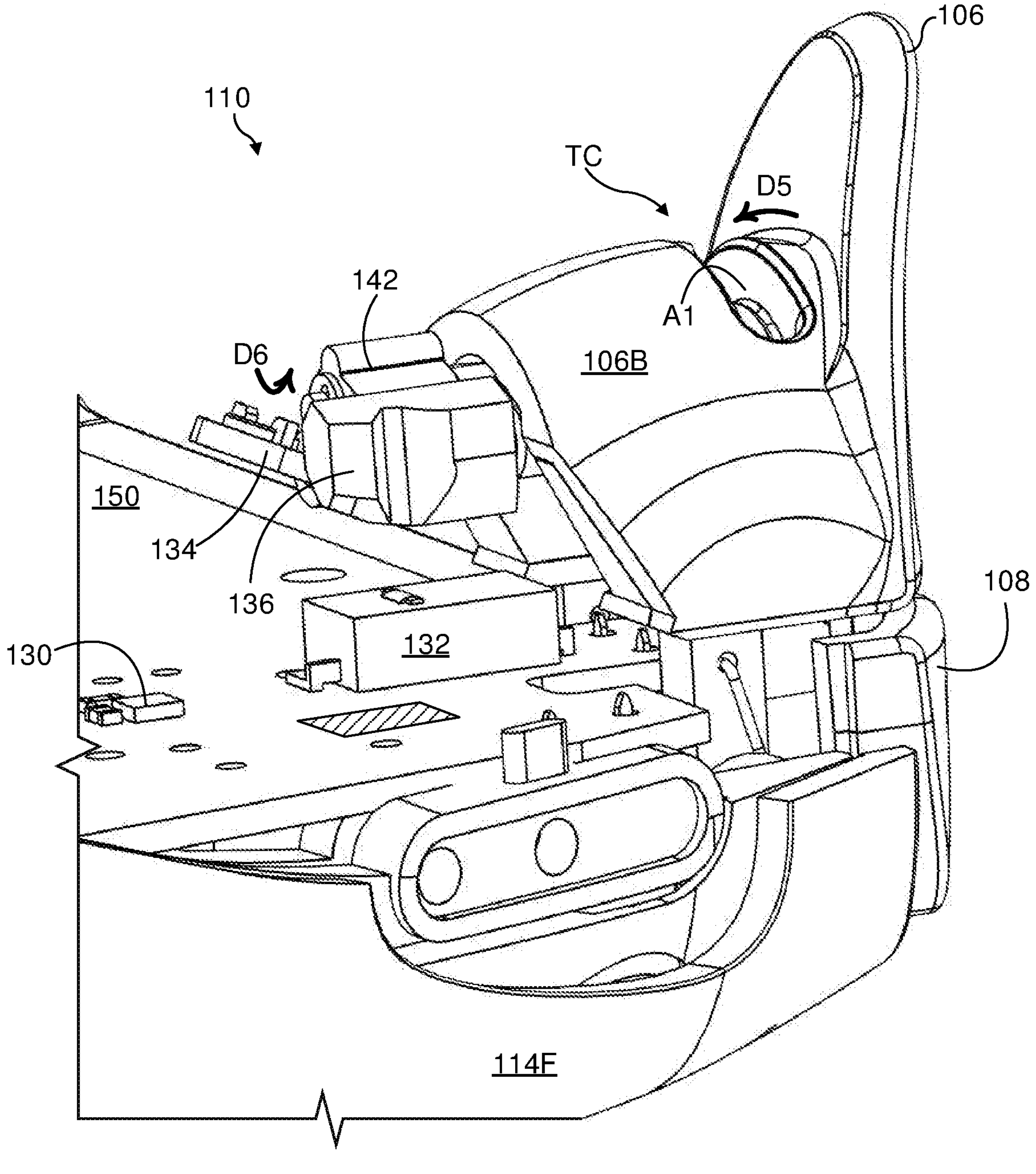
FIGS. 8 to 12 illustrate the trigger mechanism in a third mode of use.

In the second orientation or mode of use, the actuator 106 is moveable through a second range of motion, as indicated by direction arrow D3 in FIG. 6B and direction arrow D4 in FIG. 7. The second range of motion being greater than the first range of motion when the actuator control mechanism TC is in the first orientation or mode of use. The stopping block 136 comprises a contact face 139. The contact face 139 is brought into contact with an end stop 137. The end stop 137, in the illustrated embodiment, is provided by a region of the PCB board 150.

It will be appreciated that the apparatus 110 may comprises a plurality of second orientations or modes of use, each providing the actuator 101, 106 with a unique range of travel. The lever L1 may be employed to adjust the position or orientation of the stopping block 136 to select a desired one of the second orientations or modes.

In other embodiments, a pad or plate may be provided such that the contact face 139 does not contact the PCB board 150. The pad may be selected to provide a soft end stop or cushioning effect. In yet other embodiments, the pad may strengthen or reinforce the PCB board 150 so as to increase rigidity in the region of the PCB board 150 surrounding a contact region between the end stop 137 and the PCB board 150. This may increase the durability or robustness, reducing the likelihood of damage to the PCB board 150.

In the second orientation or mode of use, the actuator 106 may be moveable through an angular range of 10° to 20°, optionally through an angular range of 15°, before the stopping block 136 engages the end stop 137, which in an embodiment may comprise the contact face 139 of the stopping block 136 contacting a landing region on the PCB board 150.

Movement of the actuator 106 through the second range of motion has the effect of moving or rotating the magnet 134 relative to a sensor 130. The sensor 130 is a magnetic sensor such as, but not limited to a Hall effect sensor. In other embodiments, alternative sensors may be employed, for example (but not limited to): optical sensors, such as LiDAR sensors; inductive sensors; resistive sensors; potentiometer; or capacitive sensors, in such embodiments the magnet 134 may be replaced with a suitable detection target.

The sensor 130 produces an output dependent upon the proximity of the magnet 134 thereto and the arm 142 and stopping block 136 are sized and/or are positioned in the second orientation or mode of use to allow the magnet 134 to activate sensor 130 when actuator 106 is depressed. This output of sensor 130 is employed to execute a control or command in a computer program, which in one embodiment may be an on/off command and in another embodiment may be proportionate to the degree of depression of the actuator 106. It will be appreciated that in the second orientation or mode of use of the illustrated embodiment, the input control or command from depressing actuator 106 is provided by sensor 130 instead of switch 132 which provides the input control or command in the first orientation or mode of use.

In a third orientation or mode of use, shown in FIGS. 8, 9, 10, 11A, 11B, and 12, the arm 142 is moved into a third orientation with respect to the printed circuit board 150 disposed within the housing 114. The lever L1 is moved or rotated about the axle 138 to the third position as indicated by direction arrow D5 in FIG. 8. Movement of the lever L1 has the effect of moving or rotating the arm 142 and the stopping block 136 as indicated by direction arrow D6. In some embodiments, the lever L1 is moved through an angle of 45° from the second position to the third position (or an angle of 90° from the first position to the third position), however in other embodiments, the other angular movements may be employed. The ball 164 engages a third detent 162.

In the third orientation or mode of use, the arm 142 is oriented obliquely with respect to the printed circuit board 150 disposed within the housing 114. The stopping block 136 is moved further from vertical alignment with the shaft 140. The stopping block 136, or at least a portion thereof, is in horizontal alignment with the shaft 140, best shown in FIG. 16. The stopping block 136, or at least a second portion thereof, is in horizontal alignment with the axle 138, best shown in FIG. 16.

In the third orientation or mode of use, the stopping block 136 is moved further away from the switch 132. The arm 142 and the stopping block 136 are shaped and configured to avoid contact with the switch 132 and the PCB board 150 (and or other elements of the apparatus 110) when the actuator 106 is in a depressed or activated state, as shown in FIGS. 10, 11 and 12.

The actuator body 1068, the actuator chassis 168, and/or limbs 170 may limit travel of the actuator 106. At least one of the actuator body 1068, the actuator chassis 168, and limbs 170 may be brought into contact with another component of the apparatus 110. For example, but not limited to, the limbs 170 may be brought into contact an edge of the PCB board 150. The PCB board may be shaped to accommodate the limbs 170, recesses or notches 151 (best shown in FIG. 4A) may be provided in an edge of the PCB board 150 adjacent to the actuator 106.

Figure 9:
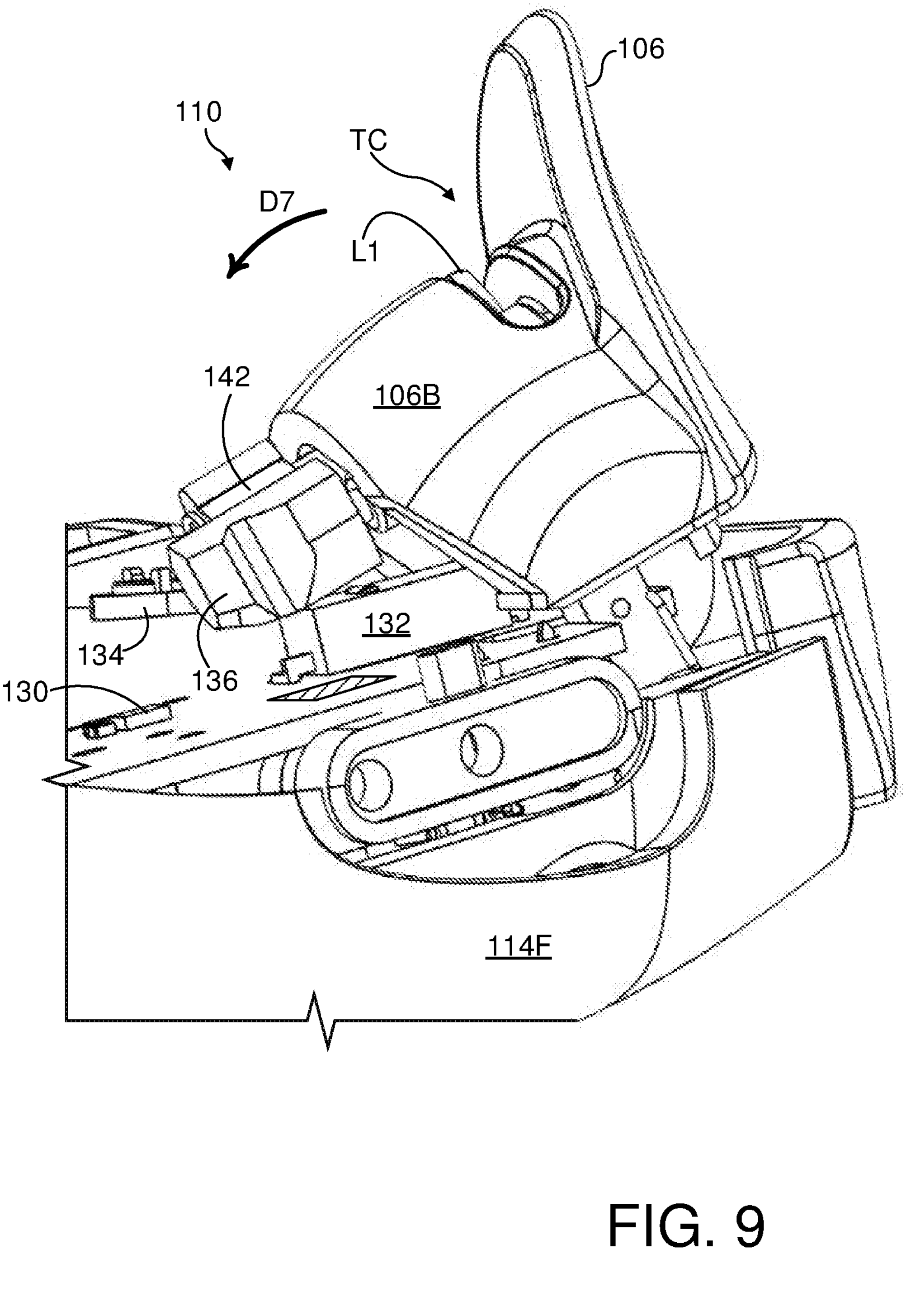
Figure 10:
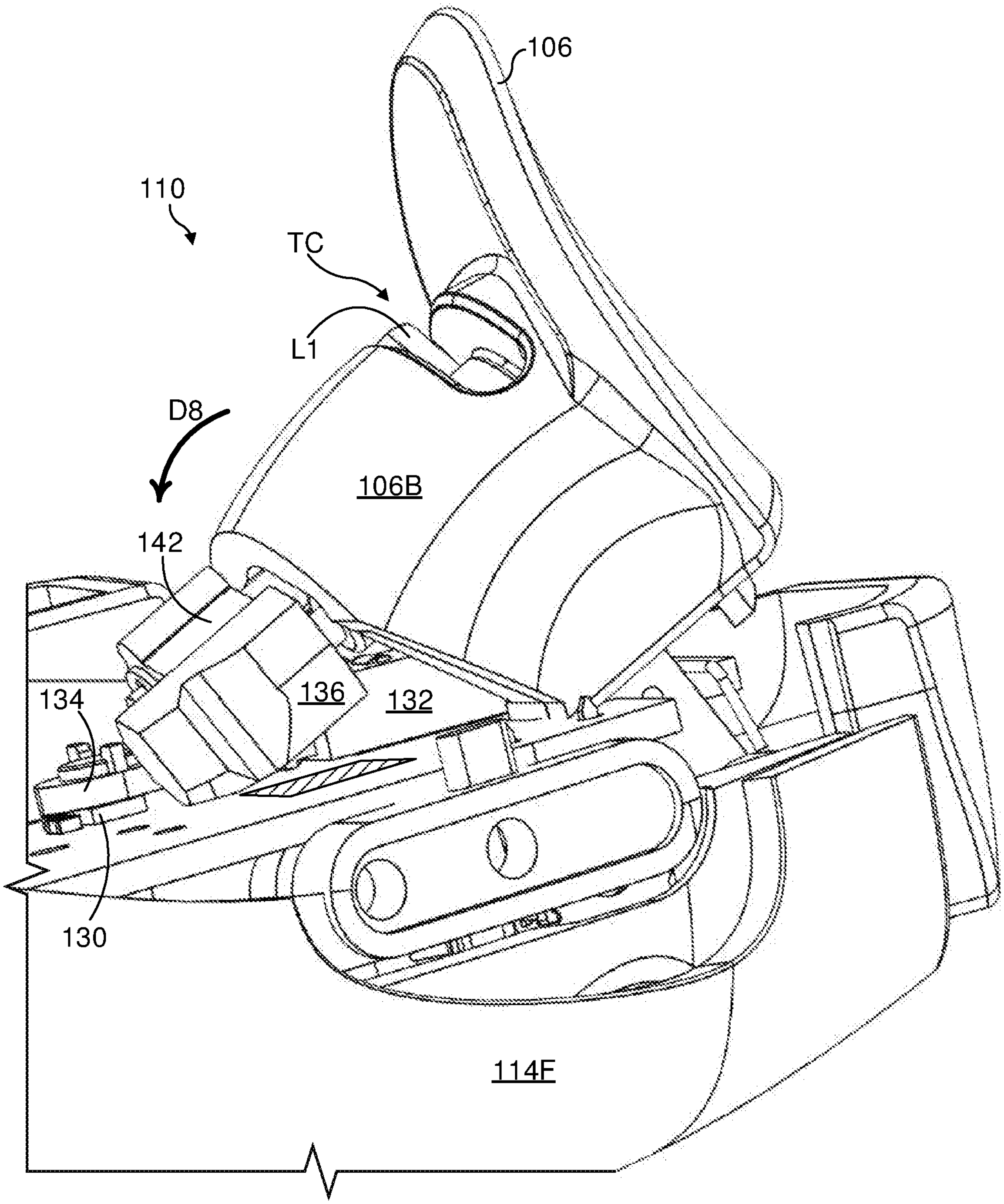
Figure 11A:
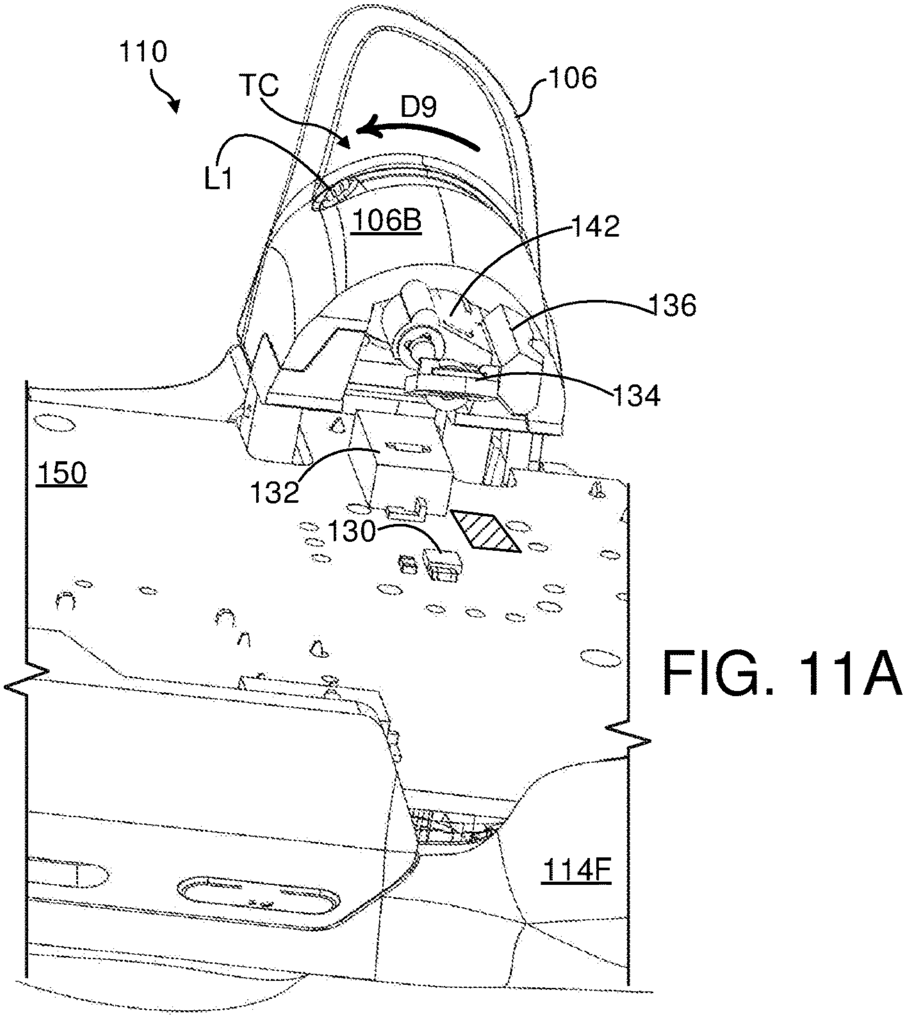
Figure 11B:
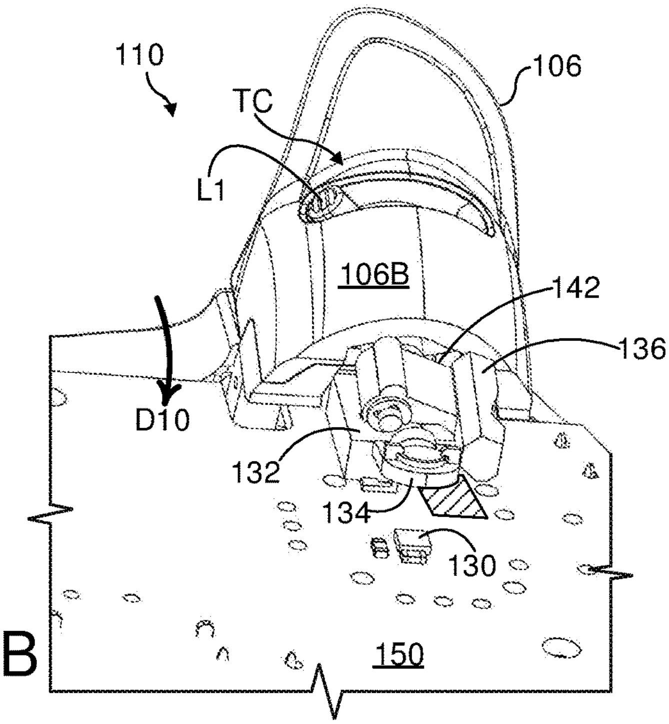
Figure 12:
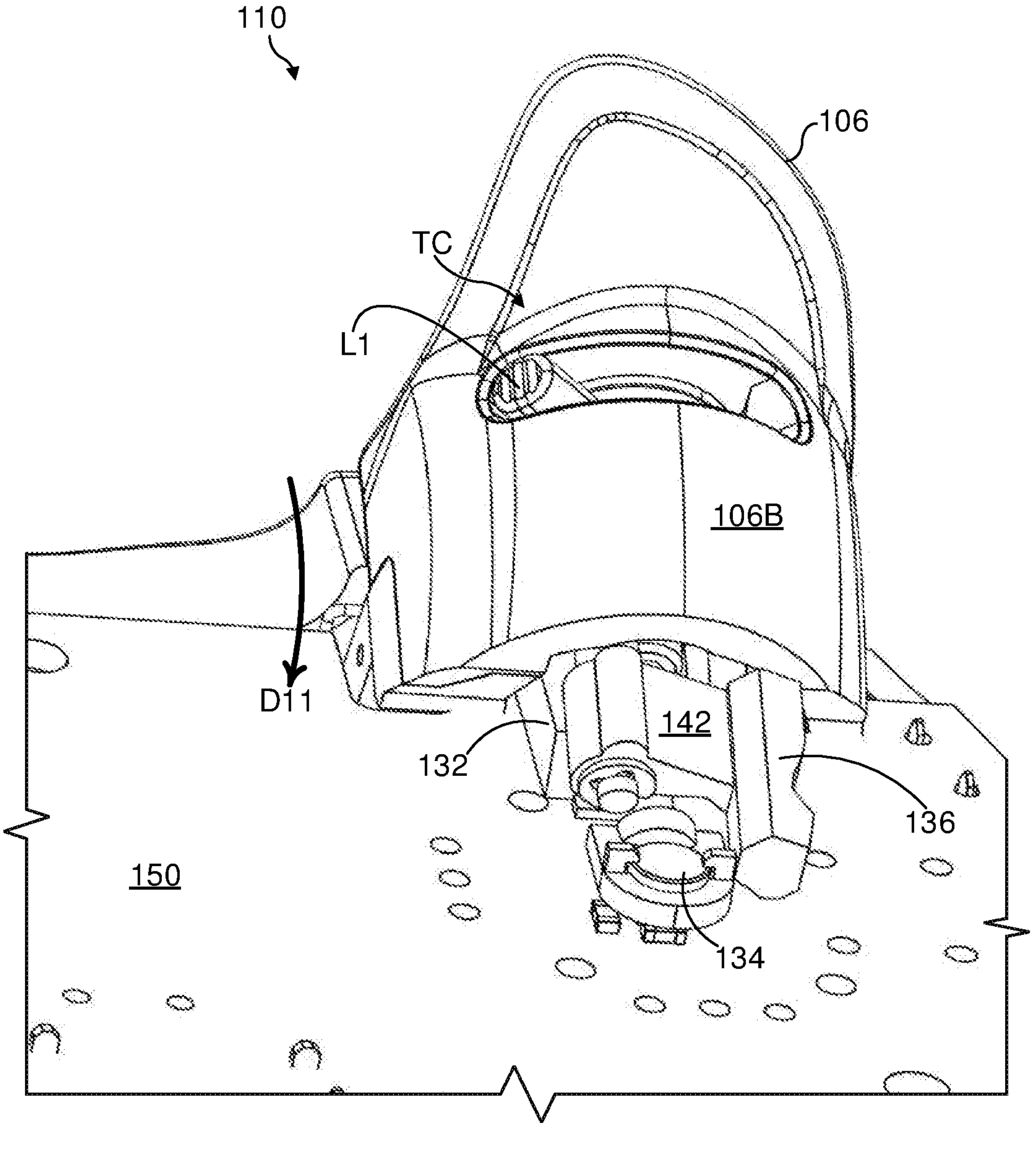

In the third orientation or mode of use, the actuator 106 is moveable through a third range of motion, as indicated by direction arrow D8 in FIG. 10, and direction arrow D11 in FIG. 12. The magnet 134 is brought closer to the sensor 130 as the actuator 106 is depressed or rotated. When the actuator 106 reaches the third mode end stop the magnet 134 is brought into close proximity to the sensor 130, the end stop prevents the magnet 134 and/or holder 134H from contacting the sensor 130 so as to prevent or reduce the likelihood of damage thereto. FIGS. 9 and 11B illustrate the actuator 106 moving through, or to, an intermediate point of the third range of travel, the intermediate point corresponds to the maximum, or end, of the second range of travel possible when the arm 142 and/or lever L1 are disposed second orientation.

It will be appreciated that the maximum degree of depression of the actuator 106 is greater in the third mode than in the second (and first) modes. In the third mode the actuator 106 may be rotated through an angle of up to 25°; in the second mode the actuator 106 may be rotated through an angle of up to 15°.

It will also be appreciated that in the third orientation or mode of use the input control or command from depressing actuator 106 is provided by sensor 130 instead of switch 132 which provides the input control or command in the first orientation or mode of use. This output of sensor 130 is employed to execute a control or command in a computer program, which in an embodiment may be proportionate to the degree of depression of the actuator 106.

It will be appreciated that the sensors 130, 132 are coupled or in communication with a processing unit which receives a signal from, or determines the state of, the sensors 130, 132 and initiates a command function in dependence thereon.

The apparatus 110 may comprise or be in communication with a processor or logic device which is configured to determine or differentiate which of the sensor 130, 132 is being activated to provide the command in response to movement of the actuator 101, 106.

In an alternative embodiment (not illustrated), the arm 142 and stopping block 135 may be mounted to the axle 138. The axle 138 may be rotationally mounted with respect to the chassis 168 and fixed to the cam 160 such that rotation of the lever L1 effects a rotation of the axle 138 and hence the arm 142, stopping block 136, magnet holder 134H, and magnet 134.

In still other embodiments, the actuator control mechanism TC may be configured with two concentric shafts, a first shaft may be disposed with a second shaft. One of the first and second shafts may be fixed relative to the actuator 101, 106 and the other is rotatable with respect to the said fixed shaft. The static or fixed shaft may carry the magnet holder 134H and magnet 134, the moveable or rotatable shaft carries the stopping block 136, cam 160, and lever L1. The static or fixed shaft may be fixed to, or integral with, the chassis 168.

The present disclosure provides an input apparatus or hand-held controller 110 for a computer, such as, but not limited to a games console, personal computer, tablet computer, smartphone or similar device capable of executing a computer program.

The apparatus 110 comprises at least one actuator 101, 106 for providing a control input for executing or initiating a command in a computer program. The actuator 101, 106 comprises a switch 130 or sensor for providing an input signal for providing the input signal. The actuator 101, 106 comprises a detection target, the detection target is monitored or sensed by the second sensor 130. The actuator 101, 106 comprises an actuator control mechanism TC for controlling the range of motion of the actuator 101, 106. The actuator control mechanism TC includes an engagement or stopping block 136. The actuator control mechanism TC provides a plurality of a configurations or modes in which the second sensor detects the detection target, each of the plurality of a configurations providing a unique range of motion. The range of motion of the at least one actuator 101,

106 being dependent upon the position or orientation of the stopping block 136. A selector is provided to enable selection of one plurality of a configurations, the selector being coupled to the stopping block 136 to adjust its position or orientation.

The apparatus 110 comprises at least one actuator 101, 106 for providing a control input for executing or initiating a command in a computer program. The actuator 101, 106 comprises a first switch 132 or sensor for providing an input signal and a second sensor 130 for providing the input signal. In some embodiments, the first switch or sensor 132 may provide a first input signal and the second sensor 130 may provide a second input signal. In some embodiments, the first input signal and second input signal may provide the same command input for the actuator 101, 106, depending on the orientation or mode of use of the actuator control mechanism TC.

The actuator 101, 106 comprises a detection target, the detection target is monitored or sensed by the second sensor 130. The second sensor 130 is arranged to detect relative movement between the detection target and the second sensor 130 or the proximity of, or distance from, the detection target to the second sensor 130. The second sensor 130 provides an input signal in dependence of the degree of movement of the actuator 101, 106. The sensor 130 provides an electrical characteristic dependent upon a measured characteristic of the detection target. In some embodiments, the detection target is a magnet 134 and the second sensor 130 is a magnetic sensor in the form of a Hall effect sensor.

The detection target may be mounted to a shaft 140 extending from an actuator chassis 168 or actuator body 106B.

The actuator 101, 106 may be rotationally mounted to the apparatus 110, to a chassis, frame or housing member. The actuator 101, 106 may be hinged to the apparatus 110, that is to say configured for rotational or pivotal movement about a single axis. The actuator 101, 106 may take the form of a trigger mechanism.

The actuator 101, 106 comprises an actuator control mechanism TC (also referred to herein as a trigger stop) for controlling the range of motion of the actuator 101, 106. The actuator control mechanism TC includes an engagement or stopping block 136. The engagement or stopping block 136 in a first mode or configuration is positioned or oriented to activate the first sensor or switch 132 to provide a command input upon depression or movement of the actuator 101, 106 through a first range of motion. The engagement or stopping block 136 in a second mode or configuration is positioned or oriented such that the actuator 101, 106 is movable through a second range of motion to activate the second sensor or switch 130 instead of the first sensor or switch 132. The second range of motion is greater than the first range and the command input for the actuator 101, 106 is provided by the second sensor or switch 130 in the second mode or configuration.

The actuator control mechanism TC may comprise at least two configurations, a first one of the at least two configurations allows movement of the actuator 101, 106 through a first range of motion and a second one of the at least two configurations allows movement of the actuator 101, 106 through a second range of motion, the second range of motion being greater than the first range of motion. The actuator control mechanism TC may comprise three, or more, configurations each configuration allowing movement of the actuator 101, 106 through a respective range of motion.

In at least one of the configurations, the engagement or stopping block 136 limits travel of the actuator 101, 106. In at least one of the configurations, the engagement or stopping block 136 activates the first sensor or switch 132 upon depression or movement of the actuator 101, 106 through its respective range of motion.

The actuator control mechanism TC may comprise a configuration in which the engagement or stopping block 136 is positioned or oriented in a stowed or idle position in which the engagement or stopping block 136 is dormant or not in use. The actuator 101, 106 can be moved or rotated through its maximum or greatest range of motion free from encumbrance by the stopping block 136.

The actuator control mechanism TC comprises a selector for selecting a desired active or operative mode or configuration. The selector comprises a cam 160 rotationally mounted within the actuator 101, 106. The cam 160 has a plurality of detents 162, in the form or recesses engageable with a catch in the form of a ball 164 disposed within a bore and resiliently biased towards one end thereof.

The cam 160 comprises a lever L1 for effecting rotational movement of the cam 160. The lever L1 extends into, or through, an opening in the actuator 101, 106.

The cam 160 may be rotationally mounted about an axle 138. The cam 160 may be rotationally mounted about a first end of the axle 138. The detection target may be affixed to a second end of the axle 138.

A shaft 140 extends, or is mounted to, the cam 160; the engagement or stopping block 136 is mounted to the shaft 140. The engagement or stopping block 136 may be located at, or proximate, a free or floating end of the shaft 140. The shaft 140 may be substantially parallel to the axle 138.

An arm 142 couples the engagement or stopping block 136 to the shaft 140. The engagement or stopping block 136 comprises a plurality of surface or faces, a first surface is arranged to engage the first switch 132 when in a first orientation. A second surface is arranged to provide an end stop limiting travel of the actuator 101, 106 when in a second orientation.

The apparatus 110 comprise an outer case 114 having a front face F, a top face T and opposing side walls. The apparatus 110 comprises at least one control located on the top face T of the apparatus 110. The apparatus 110 is shaped to be held in both hands of a user such that the user's index fingers are positioned to operate the at least one control or actuator 101, 106 located on the top face T of the apparatus 110.

In some embodiments, the apparatus 110 may comprise an overtravel limitation device (not shown). The overtravel limitation device is arranged to prevent or inhibit transfer of excess or damaging force or pressure onto the first switch 132. The stopping block 136 may be configured to engage or contact an overtravel landing zone, the landing zone may be provided by a region of the PCB board 150, controller chassis member, or housing 114. When the actuator 101, 106 is depressed or moved in the first mode or configuration, the stopping block 136 contacts the first switch 132 whereby activating the first switch 132. The stopping block 136 may be configured to engage or contact an overtravel landing zone simultaneously with activation of the first switch 132, or be brought into sufficiently close proximity to the landing zone, so as to prevent or inhibit additional or excessive force from being applied to the first switch 132.

It will be appreciated that in the first orientation or mode of operation, the actuator control mechanism TC may have the effect of allowing the actuator 101, 106 to act or feel like a button or digital/tap trigger rather than a traditional trigger which may be appropriate for first type of application or game where the shortest possible trigger range of motion is desired. Similarly, in the second orientation or mode of operation, the actuator control mechanism TC may have the effect of allowing the actuator 101, 106 to act or feel like a traditional analogue trigger with a shortened trigger pull which may be appropriate for a second type of application or game where an analogue or proportional input is desired, but a long trigger range of motion is not desired. Finally, in the third orientation or mode of operation, the actuator control mechanism TC may have the effect of allowing the actuator 101, 106 to act or feel like a traditional analogue trigger with a full trigger pull which may be appropriate for a third type of application or game where an analogue or proportional input is desired as is a full trigger range of motion. The actuator control mechanism TC of the present disclosure allows for all three modes of operation/types of trigger responses to be easily selected by the user, including in the middle of gameplay, without need to permanently alter the input apparatus 110.

It can also be appreciated that various changes may be made within the scope of the present invention. For example, the size and shape of the triggers may be adjusted to accommodate controllers of differing size or shape.

In some embodiments, the apparatus may be provided with a mechanism for adjusting or controlling the start or rest position of the actuator or trigger also known as a "hair trigger". This mechanism would allow the range of motion of the actuator to be adjusted, increased or decreased as desired depending upon the application for which the apparatus was being employed. For example, but not limited to, the start or rest position of the actuator may be adjusted such that the detection target was brought into closer proximity to the second sensor. In another embodiment, the start or rest position of the actuator may be adjusted such that the stopping block 136 was brought into closer proximity to the first sensor or switch 132. In this way any dead zone—range of movement of the actuator prior to activation of the first or second sensors—may be reduced or eliminated. In some embodiments the hair trigger feature may be implemented in software, such that rather than adjusting the physical position or orientation of the actuator a threshold value or characteristic of a sensor or switch required for activation of a command function can be adjusted such that degree of movement of the actuator required to initiate the command is reduced.

In some embodiments, the microswitches may be replaced with a magnetic switch or sensor, for example a reed switch or hall sensor, an optical switch or sensor, or any other desired type of switch or sensor. Further it is envisaged that the user may be provided with feedback to indicate that the switch has been activated. The feedback may be aural or haptic, for example, such as an audible click.

It is envisaged that the controllers may be coupled to a games console or computer by a wired connection or by a wireless connection device.

It is also envisaged that the controller may be constructed as a shell or caddy into which a hand-held electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It will be recognised that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An actuator for controlling a command control in a computer input apparatus including a first sensor and a second sensor, the actuator comprising an actuator body and a detection target mounted thereto, the detection target being detectable by the second sensor, wherein the actuator comprises an actuator control mechanism having at least two configurations for controlling movement of the actuator relative to the computer input apparatus, the actuator control mechanism comprises a stopping block moveable relative to the actuator body, wherein in a first configuration the stopping block provides a first range of motion for the actuator to allow the actuator to activate the first sensor to provide the command control, and in a second configuration the stopping block provides a second range of motion for the actuator greater than the first range of motion to allow the actuator to activate the second sensor to provide the command control without activating the first sensor, the actuator control mechanism further comprises a selector for selecting a desired one of the first and second configurations.

2. An actuator according to claim 1 wherein, the actuator control mechanism comprises a third configuration in which the stopping block is positioned in an idle position in which the stopping block provides a third range of motion for the actuator greater than the first and second ranges of motion to allow the actuator to activate the second sensor to provide the command control without activating the first sensor.

3. An actuator according to claim 1 wherein, the selector comprises a cam rotationally mounted to the actuator.

4. An actuator according to claim 3 wherein, the cam comprises a plurality of detents engageable with a catch.

5. An actuator according to claim 4 wherein, the catch comprises a ball disposed within a bore and resiliently biased towards one end thereof.

6. An actuator according to claim 3 wherein, the selector comprises a lever for effecting rotational movement of the cam.

7. An actuator according to claim 6 wherein, the lever extends into an opening in the actuator body.

8. An actuator according to claim 6 wherein, the lever extends from the cam.

9. An actuator according to claim 3 wherein, the cam is rotationally mounted about an axle.

10. An actuator according to claim 3 wherein, the cam is rotationally mounted about a first end of the axle and the detection target is affixed to a second end of the axle.

11. An actuator according to claim 9 wherein, a shaft extends from the cam and the stopping block is mounted to the shaft.

12. An actuator according to claim 11 wherein, the stopping block is located proximate a floating end of the shaft.

13. An actuator according to claim 11 wherein, the shaft is oriented substantially parallel to the axle and is rotatable thereabout.

14. An actuator according to claim 11 wherein, an arm couples the stopping block to the shaft.

15. An input apparatus for a computer comprising an outer case having a front face, a top face and opposing side walls, the apparatus comprising at least one control located on the top face of the apparatus, the apparatus being shaped to be held in both hands of a user such that the user's index fingers are positioned to operate the at least one control located on the top face of the apparatus, the at least one control comprising an actuator pivotally coupled to the input apparatus, a first sensor, and a second sensor, the actuator comprising an actuator body and a detection target mounted thereto, the actuator body extending through an opening in the outer case, the detection target being detectable by the second sensor, wherein the actuator comprises an actuator control mechanism having at least two configurations for controlling movement of the actuator relative to the outer case, the actuator control mechanism comprises a stopping block moveable relative to the actuator body, wherein in a first configuration the stopping block provides a first range of motion for the actuator such that the actuator is configured to activate the first sensor to provide an activation signal, and in a second configuration the stopping block provides a second range of motion for the actuator greater than the first range of motion such that the actuator is configured to activate the second sensor to provide the activation signal without activating the first sensor, the actuator control mechanism further comprises a selector for selecting a desired one of the at least two configurations.

16. An input apparatus according to claim 15 wherein, the second sensor is arranged to detect relative movement between the detection target and the second sensor.

17. An input apparatus according to claim 15 wherein, the second sensor is arranged to detect the proximity of the detection target to the second sensor.

18. An input apparatus according to claim 15 wherein, the actuator is rotationally mounted to a frame member of the apparatus.

19. An input apparatus according to claim 15 wherein, the actuator is a trigger mechanism.

20. An input apparatus according to claim 15 wherein, the first sensor is a switch.

21. An input apparatus according to claim 15 wherein, the actuator control mechanism comprises three or more configurations each configuration allowing movement of the actuator through a respective range of motion.

22. An input apparatus according to claim 21 wherein, in at least one of the at least two configurations the stopping block limits travel of the actuator.

* * * * *